(12) United States Patent
Schmeichel et al.

(10) Patent No.: US 6,543,835 B2
(45) Date of Patent: Apr. 8, 2003

(54) TONNEAU COVER HAVING REAR BAR LOCK

(75) Inventors: Charles M. Schmeichel, Jamestown, ND (US); Steven C. Schmeichel, Jamestown, ND (US)

(73) Assignee: Agri-Cover, Inc., Jamestown, ND (US)

( * ) Notice: Subject to any disclaimer, the term of this patent is extended or adjusted under 35 U.S.C. 154(b) by 0 days.

(21) Appl. No.: 09/929,991

(22) Filed: Aug. 14, 2001

(65) Prior Publication Data

US 2002/0096268 A1 Jul. 25, 2002

Related U.S. Application Data

(60) Provisional application No. 60/225,109, filed on Aug. 14, 2000.

(51) Int. Cl.[7] .................................................. B60P 7/04
(52) U.S. Cl. .......................... 296/100.15; 296/100.16; 135/907
(58) Field of Search ...................... 135/907; 160/368.1; 296/100.01, 100.11, 100.14, 100.15, 100.16, 100.17, 100.18

(56) References Cited

U.S. PATENT DOCUMENTS

| | | | |
|---|---|---|---|
| 1,500,091 A | 7/1924 | Weiske et al. ............. | 296/95.1 |
| 2,906,323 A | 9/1959 | Macy ........................... | 160/62 |
| 4,036,521 A | 7/1977 | Clenet ........................ | 296/100 |
| 4,272,119 A | 6/1981 | Adams ........................ | 296/100 |
| 4,757,854 A | 7/1988 | Rippberger ................. | 160/391 |
| 4,838,602 A | 6/1989 | Nett ............................ | 296/100 |
| 4,923,240 A | 5/1990 | Swanson .................... | 296/100 |
| 5,040,843 A | 8/1991 | Russell et al. ................ | 296/98 |
| 5,058,652 A | 10/1991 | Wheatley et al. ........... | 160/327 |
| 5,076,338 A | * 12/1991 | Schmeichel et al. ..... | 160/368.1 |

(List continued on next page.)

OTHER PUBLICATIONS

Shur Co, Inc. picture of tonneau cover; Sep. 1999.*
Photocopy of a picture taken in Sep., 1999, of a tonneau cover product shown at the Big Iron Farm Show in Fargo, ND, by Shur–Co, Inc. of Yankton, SD.
Drawing of a tonneau cover product shown in Sep., 1999 at the Big Iron Farm Show in Fargo, ND, by Shur–Co, Inc. of Yankton, SD.

Primary Examiner—D. Glenn Dayoan
Assistant Examiner—Paul Chenevert
(74) Attorney, Agent, or Firm—Moore & Hansen

(57) ABSTRACT

A tonneau cover apparatus for attaching a flexible cover about a cargo box of a vehicle, preferably a pickup truck. The apparatus preferably includes, a support frame removably attached about the perimeter of a cargo box of the vehicle, an elongated end plate attached to an end of the flexible cover, an end plate engagement member attached to the support frame, a latching member movably attached to the support frame, and a locking member movably attached to the end plate. The end plate and the end plate engagement member are preferably provided with complementarily shaped surfaces which enable the end plate to engage with and swing around or pivot with respect to the support frame into and out of a fixed, stretching position where the flexible cover may be alternatively tensed and relaxed. The end plate may be retained in the fixed, stretching position by a latching member that operatively connects the end plate to the support frame or a locking member that operatively connects the support frame to the end plate. The latching member and the locking member may be used individually or in combination with each other to prevent accidental or deliberate unauthorized access to a covered cargo box of a vehicle. In alternate embodiments, a plurality of locking members are provided that slide within a channel in the end plate. In certain embodiments the locking members are spring biased toward a locking position where the locking member engages a flange to prevent the end plate from moving out of the fixed, stretching position.

51 Claims, 14 Drawing Sheets

U.S. PATENT DOCUMENTS

| | | | |
|---|---|---|---|
| 5,174,353 A | * 12/1992 | Schmeichel et al. | 160/368.1 |
| 5,251,951 A | * 10/1993 | Wheatley | 296/100.15 |
| 5,263,761 A | 11/1993 | Hathway et al. | 296/100 |
| 5,350,213 A | 9/1994 | Bernardo | 296/98 |
| 5,364,154 A | 11/1994 | Kaiser | 296/100 |
| 5,480,206 A | 1/1996 | Hathaway et al. | 296/36 |
| 5,487,585 A | 1/1996 | Wheatley | 296/100 |
| 5,522,635 A | 6/1996 | Downey | 296/100 |
| 5,540,475 A | 7/1996 | Kersting et al. | 296/100 |
| 5,553,652 A | * 9/1996 | Rushford | 160/354 |
| 5,584,521 A | 12/1996 | Hathway et al. | 296/36 |
| 5,655,808 A | 8/1997 | Wheatley | 296/100 |
| 5,758,922 A | * 6/1998 | Wheatley | 296/100.15 |
| 5,765,902 A | 6/1998 | Love | 296/100 |
| 5,788,315 A | 8/1998 | Tucker | 296/100 |
| 5,860,691 A | * 1/1999 | Thomsen et al. | 296/100.18 |
| 5,906,407 A | 5/1999 | Schmeichel | 296/100.15 |
| 5,921,603 A | 7/1999 | Karrer | 296/39.2 |
| 6,024,401 A | 2/2000 | Wheatley | 296/100.18 |
| 6,024,402 A | 2/2000 | Wheatley | 296/100.18 |
| 6,030,021 A | 2/2000 | Ronai | 296/98 |
| 6,053,556 A | 4/2000 | Webb | 296/98 |
| 6,053,558 A | * 4/2000 | Weldy et al. | 296/100.17 |
| 6,234,561 B1 | * 5/2001 | Huotari | 296/100.15 |
| 6,257,306 B1 | 7/2001 | Weldy | 160/327 |
| 6,257,647 B1 | * 7/2001 | Ninness et al. | 296/100.15 |
| 6,264,266 B1 | 7/2001 | Rusu et al. | 296/100.07 |
| 6,439,640 B1 | 8/2002 | Wheatley | 296/100.18 |

* cited by examiner

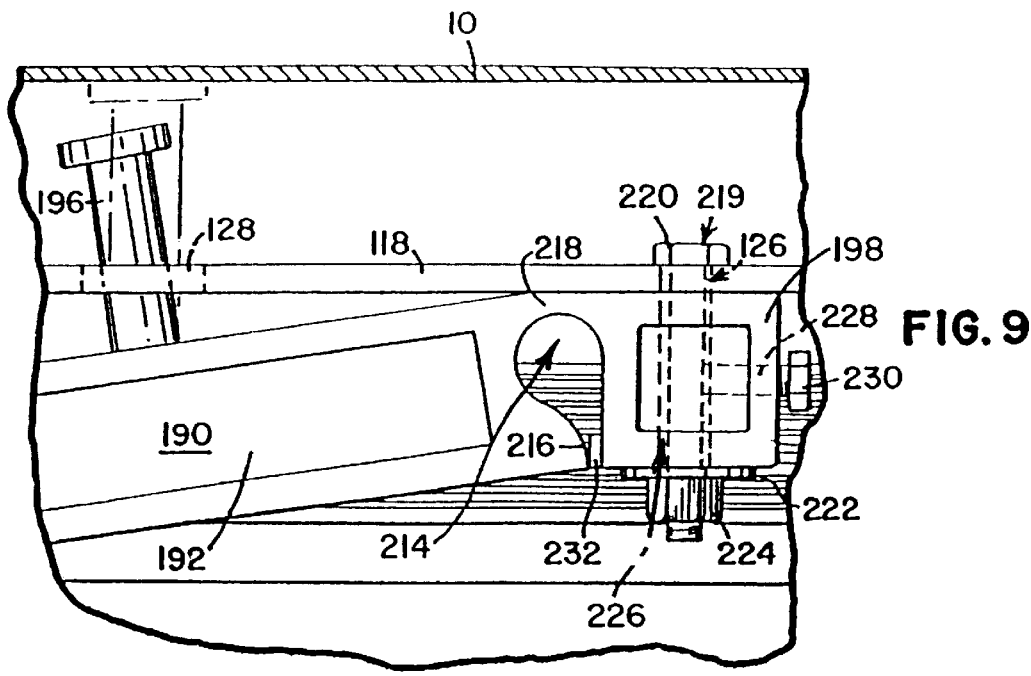
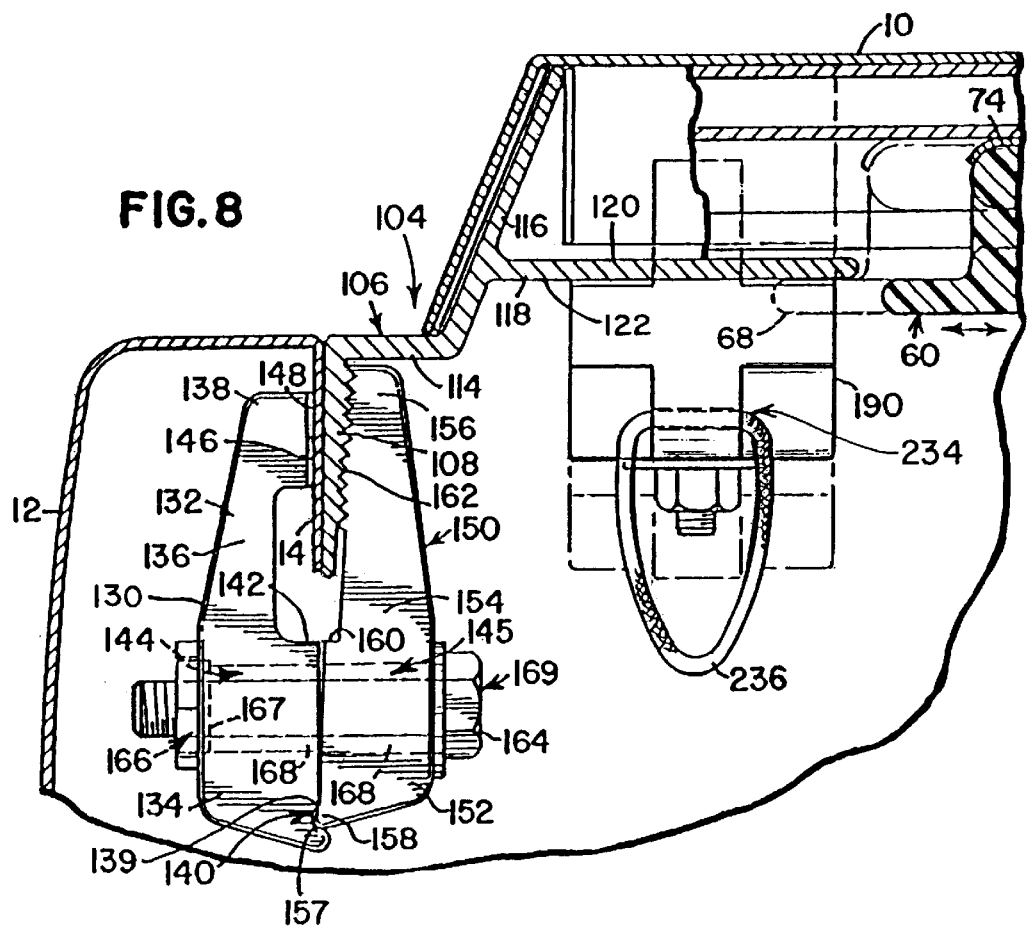

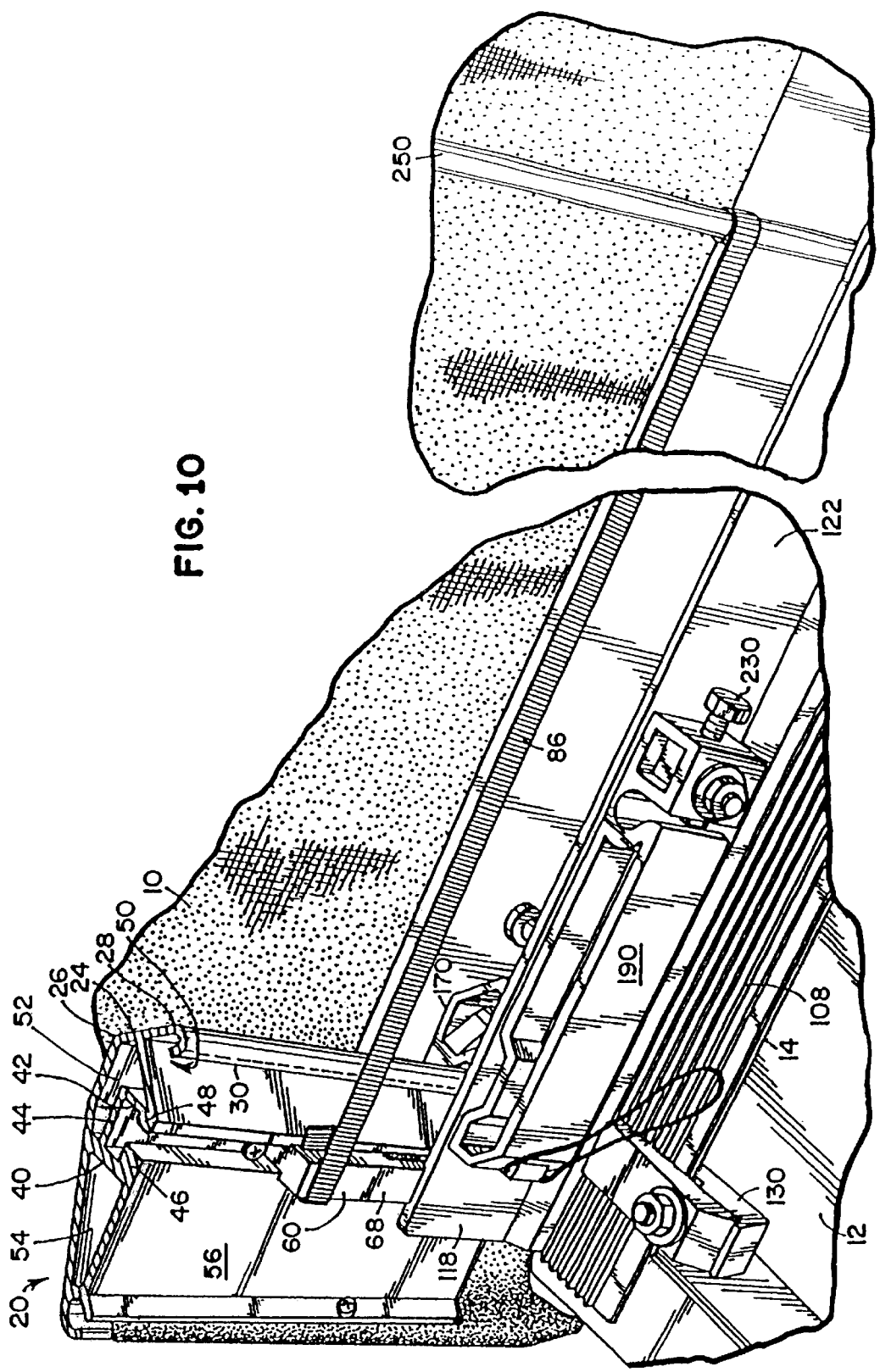

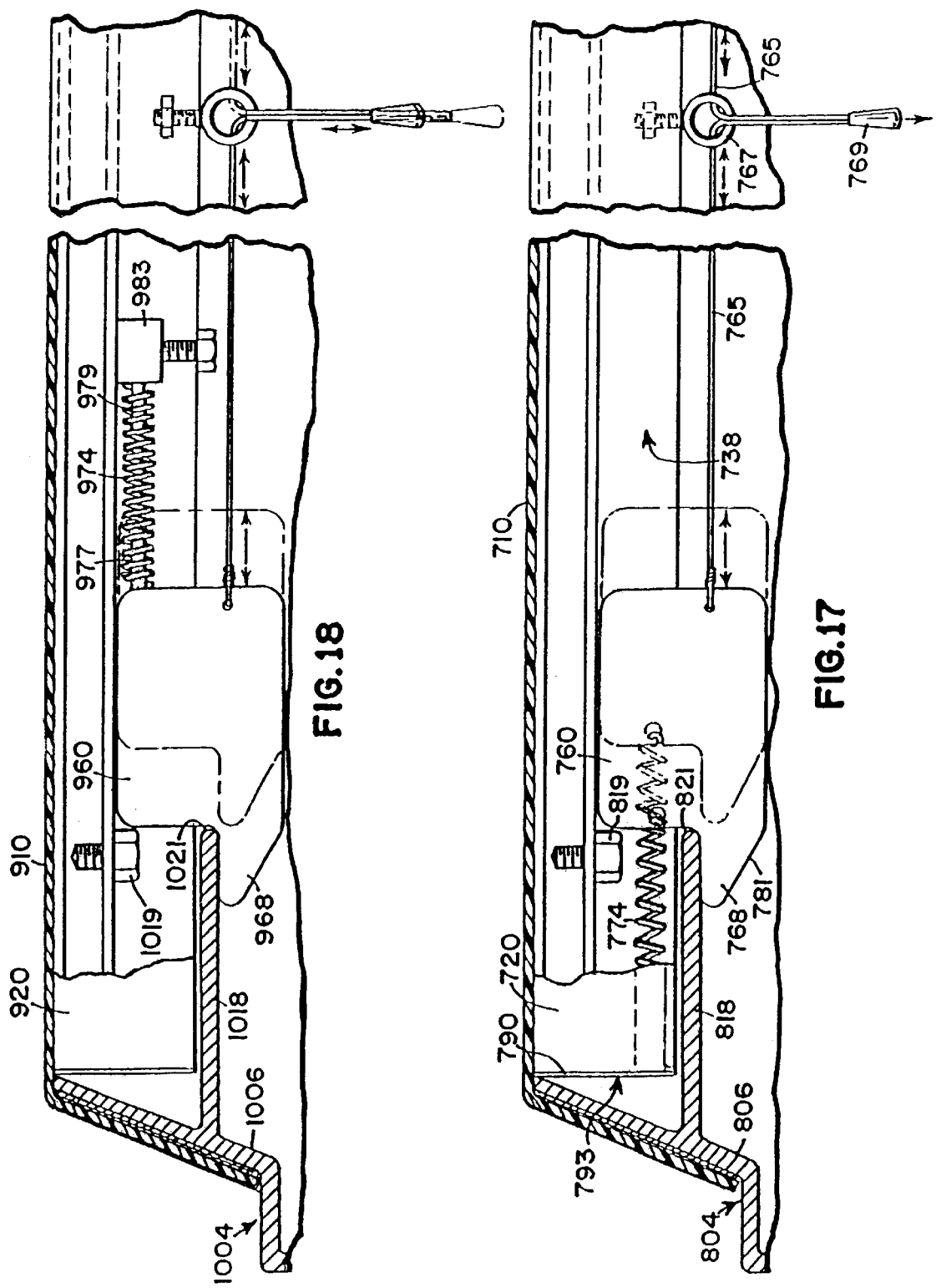

TONNEAU COVER HAVING REAR BAR LOCK

CROSS-REFERENCE TO OTHER APPLICATIONS

The present application claims priority to co-pending U.S. Provisional Patent Application Ser. No. 60/225,109 filed Aug. 14, 2000 and entitled TONNEAU COVER HAVING REAR BAR LOCK.

BACKGROUND OF THE INVENTION

The present invention relates to Tonneau Covers, particularly Tonneau Covers including a flexible cover and an apparatus for attaching the flexible cover to a cargo box of a pick up truck; the apparatus includes a rear bar or end plate and end plate engagement members cooperating to impart tension to the flexible cover when the end plate pivots into or is positioned in a closed position with respect to the end plate engagement members; and, a locking member or members preventing unauthorized detachment of the end plate from the end plate engagement members.

DESCRIPTION OF THE PRIOR ART

Numerous protective covers for preventing rain, debris and wind from damaging or disrupting the contents of a pickup truck bed are currently available. Generally, the covers are made of some sort of fabric, often coated with a polymeric material, which is detachably fastenable to a rigid frame so as to enclose and protect a given area. The covering materials used are generally stretchable to the extent that once they are in a position, they are pulled taut and then attached to the frame by numerous methods such as snaps, grommets, or hook-and-loop fasteners and stretcher bars.

The use of hook-and-loop type fasteners and stretcher bars to fasten a cover to a frame structure forms the subject matter of U.S. Pat. Nos. 5,076,338 ('338 patent) and 5,174,353 ('353 patent) issued to Steven Schmeichel et al., the disclosures of which are incorporated herein by reference.

In the Schmeichel et al. patents, an edge portion of a covering fabric is attached to a generally L-shaped end plate or stretcher bar. The end plate is provided with a peak or crest, which pivotally contacts ends of the frame structure as the end plate is rotated into a fixed, stretching position. As the end plate rotates into the fixed, stretching position, an enlarged ridge of the end plate is either captured by a spring loaded lock element as depicted in a first embodiment, or engages and deflects a biased pawl element as depicted in a second embodiment. After the enlarged ridge passes the lock or pawl element, the lock or pawl element springs back to it's undeflected state thereby maintaining the end plate in the fixed, stretching position. In order to move the end plate out of the fixed stretching position, the biasing force of the lock or the pawl element must be overcome. In the first embodiment, this biasing force may be overcome by the movement of the enlarged ridge as the end plate is pivoted out of the fixed stretching position. In the second embodiment, deflection of the pawl is best accomplished by manipulating a release member which projects from a portion of a latching member, or by opening the tailgate and manually disengaging the pawl from the enlarged ridge.

Although the Schmeichel et al. patents teach a number of significant improvements over the prior art, there are several limitations of the prior art, which are addressed and improved upon by the present invention.

One limitation of the first embodiment of the Schmeichel et al. patents, as depicted, is that the L-shaped lock member, by virtue of it's resilient nature, merely imparts a dynamic force, which tends to maintain the end plate in the fixed stretching position. This force, however, can be overcome by the action of the enlarged ridge as it moves past the inclined portion of the L-shaped lock. Thus, the L-shaped lock does not function as a lock in a conventional sense.

A limitation of the second embodiment of the Schmeichel et al. patents is in the location and construction of the lock element. As depicted, the lock element comprises a pawl element, which is attached to one end of an elongated leaf spring. The other end of the leaf spring is attached to a connector, which in turn is connected to a side rail of the support frame structure. While this embodiment functions to lock the end plate and support frame structure in the fixed stretching position, it would appear that absent support, the pawl element may be forcibly disengaged and/or damaged by forcible movement of the end plate out of the fixed, stretching position.

Another limitation of the second embodiment of the Schmeichel et al. patents is that the end plate may be disengaged from the lock member by a person with knowledge of the location of the release member.

A limitation common to both the first and second embodiments of the Schmeichel et al. patents regards the attachment point and the design of the engagement member (or strike) which engages the end plate. As depicted in the drawings the strike is attached to the frame structure by a fastening element located a substantial distance from the inclined portion of the strike. This allows the strike to be flexed or bent upwardly in reaction to the stress forces exerted on the strike when the end plate is pivoted into and out of the fixed stretching position. Repeated flexure and/or bending may result in loosening and/or premature failure of the strike. Additionally, the strike includes a relatively thin lip portion which extends beyond the body of the strike and which rotatingly contacts the end plate as it is pivoted into and out of the fixed stretching position. This lip portion is subject to gh amounts of stress and is subject to flexure and/or bending which may lead to premature failure.

Another limitation common to both the first and second embodiments of the Schmeichel et al. patents is in the attachment of the support frame about the perimeter of a cargo box of the vehicle. In Schmeichel et al., a support frame is attached to an inner side-wall by a C-shaped clamp. The effectiveness of the clamp may, however, become compromised by overtightening the clamping bolt and may lead to deformation and/or failure the body of the clamp. Additionally, due to the tapered vertical attachment portion of the frame support, there is a tendency for the clamp to become dislodged from the clamping position.

The present invention provides improvements which address these and other limitations associated with the prior art.

SUMMARY OF THE INVENTION

The present invention relates to a tonneau cover apparatus for attaching and locking a flexible cover about a cargo box of a vehicle such as a pickup truck. The apparatus preferably includes a support frame, which is removably attached about the perimeter of the cargo box of the vehicle by at least one clamp. The flexible cover is attached to the support frame and to an end plate. The end plate is configured to pivotally engage an end plate engagement member, which is attached to the support frame. As the end plate pivots about the end plate engagement member to a fixed stretching position, the flexible cover is suitably stretched or tensed. In preferred embodiments, the end plate is releasably retained in the fixed stretching position by a latching member which is attached to the support frame and/or by a locking member which is slidingly attached to the end plate and which may be operatively connected to the end plate. A side bar securing clamp is also provided to secure the support frame to the pick up truck.

An object of the present invention is to improve the attachment of the support frame to an inner side-wall of a vehicle.

Another object of the present invention is to reduce the risk of over tightening in an attachment clamp.

Another object of the present invention is to maximize and simplify securement of the end plate engagement member to the support frame.

Yet another object of the present invention is to reduce areas of high stress concentrations in the end plate engagement member.

Still another object of the present invention is to lessen the exposure of the latching member relative to the support frame.

Another object of the present invention is to minimize deflection of the engagement portion of the latching member in response to force exerted by the end plate.

Yet another object of the present invention is to provide a superior side bar securing clamp which withstands the normal stresses associated with securing the support frame to side walls of the pickup truck.

Still another object of the present invention is to reduce inadvertent and/or unauthorized disengagement of a flexible cover from a cargo box of a vehicle.

These and various other advantages and features of novelty which characterize the present invention are pointed out with particularity in the claims annexed hereto and forming a part hereof. However, for a better understanding of the invention, its advantages and objects obtained by its use, reference should be made to the drawings which form a further part hereof, and to the accompanying descriptive matter, in which there is illustrated and described a preferred embodiment of the present invention.

BRIEF DESCRIPTION OF THE DRAWINGS

FIG. 5 is a simplified fragmentary perspective view of a side rail 106 of the preferred apparatus, partially shown in FIG. 3, with the latch member attached;

FIG. 8 is an enlarged fragmentary sectional view as seen generally along line 8—8 of FIG. 3 which shows a portion of the preferred apparatus as it is attached to an inner wall 14 of a side wall 12 of a cargo box of a pickup truck and which illustrates in phantom lines the locking member as it moves into engagement with the side rail 106;

FIG. 9 is an enlarged fragmentary sectional view of the latching member illustrating the range of motion as the release member 196 is depressed from the position shown in phantom so that the end plate 20 (not shown) can be disengaged from the end plate engagement member 170 (not shown) and showing the adjustability of the latching member relative to the inwardly extending flange 118 of the side rail;

FIG. 10 is a fragmentary perspective view from inside a cargo box of the pickup truck when the tailgate is in an open position (not shown), the view showing the preferred apparatus in the fixed stretching position with the latching member operatively engaging the end plate, and the locking member disengaged from the inwardly extending flange;

FIG. 17 is a further fragmentary sectional view of the alternate embodiment shown in FIG. 16 except the locking member 760 is shown in a locked or latched position where the finger portion 768 is fully engaged with the inwardly extending flange 818 and abuts against stop bolt 819 which prevents locking member 760 from being drawn in further by the tension spring 774; and FIG. 18 is a fragmentary sectional view similar to that shown in FIG. 17, but of a further alternate embodiment the same as that shown in FIG. 17 except that the locking member 960 is biased toward a position consistent with a locked or a latched position by a compression spring 980 pushing the locking member 960 to such position rather than operating in the manner the tension spring 774 shown in FIG. 17, that biases the locking member 760 by pulling on it.

DETAILED DESCRIPTION OF THE PREFERRED EMBODIMENT(S)

Figure 1:
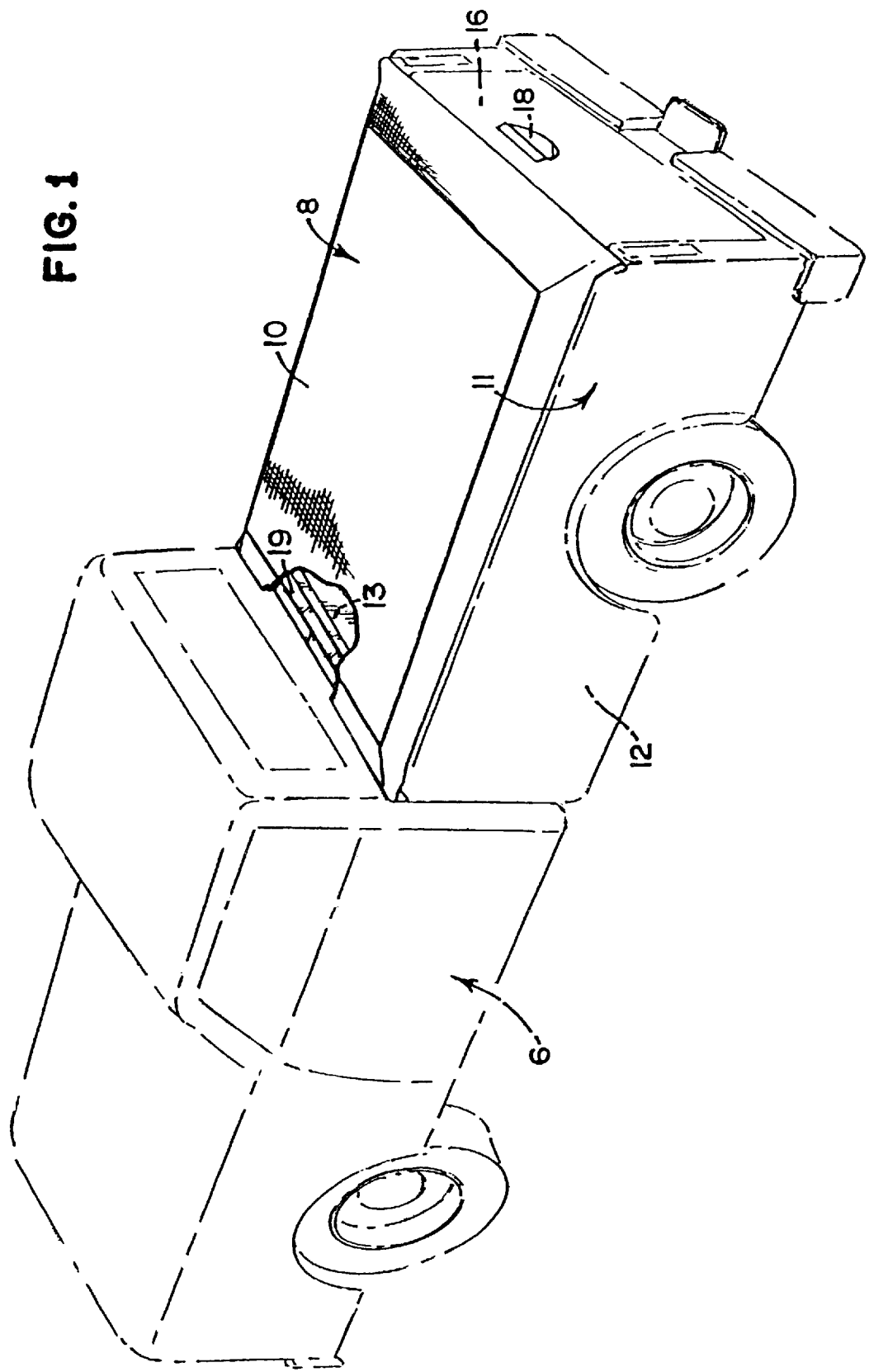
FIG. 1 is a partially broken away perspective view of a preferred embodiment of a tonneau cover apparatus 8 of the present application, including a flexible cover 10 in accordance with the present invention, attached to a pickup truck 6 (shown in broken lines) with the cover 10 being disposed in a covered or fixed stretching position.

Referring now to the drawings, and specifically FIGS. 1–10, there is illustrated a preferred embodiment of the present invention, wherein reference numeral 6 designates a vehicle, preferably a pickup truck, reference numeral 8 designates a preferred tonneau cover apparatus and reference numeral 10 designates the flexible cover. FIG. 1 illustrates a flexible cover 10 in use on a cargo box 11 of a pickup truck 6 having two outer sidewalls 12, each having an inner sidewall 14 (shown in FIG. 8), a forward end 13 and a tailgate 16, preferably with a release handle and lock mechanism 18, actuated with a key (not shown) or, alternatively, a remotely actuated lock mechanism, having a remote keyless actuator (not shown), like those which are now well known in the art. As depicted, the flexible cover 10 is covering a top of a perimeter of the cargo box 11 of the pickup truck 6. The flexible cover 10 is secured to a front plate 19 and an end plate 20 each of which are secured to support frame 104 that includes rails 106 which are clamped to the respective sidewalls 12 of the pickup truck 6.

Figure 2:
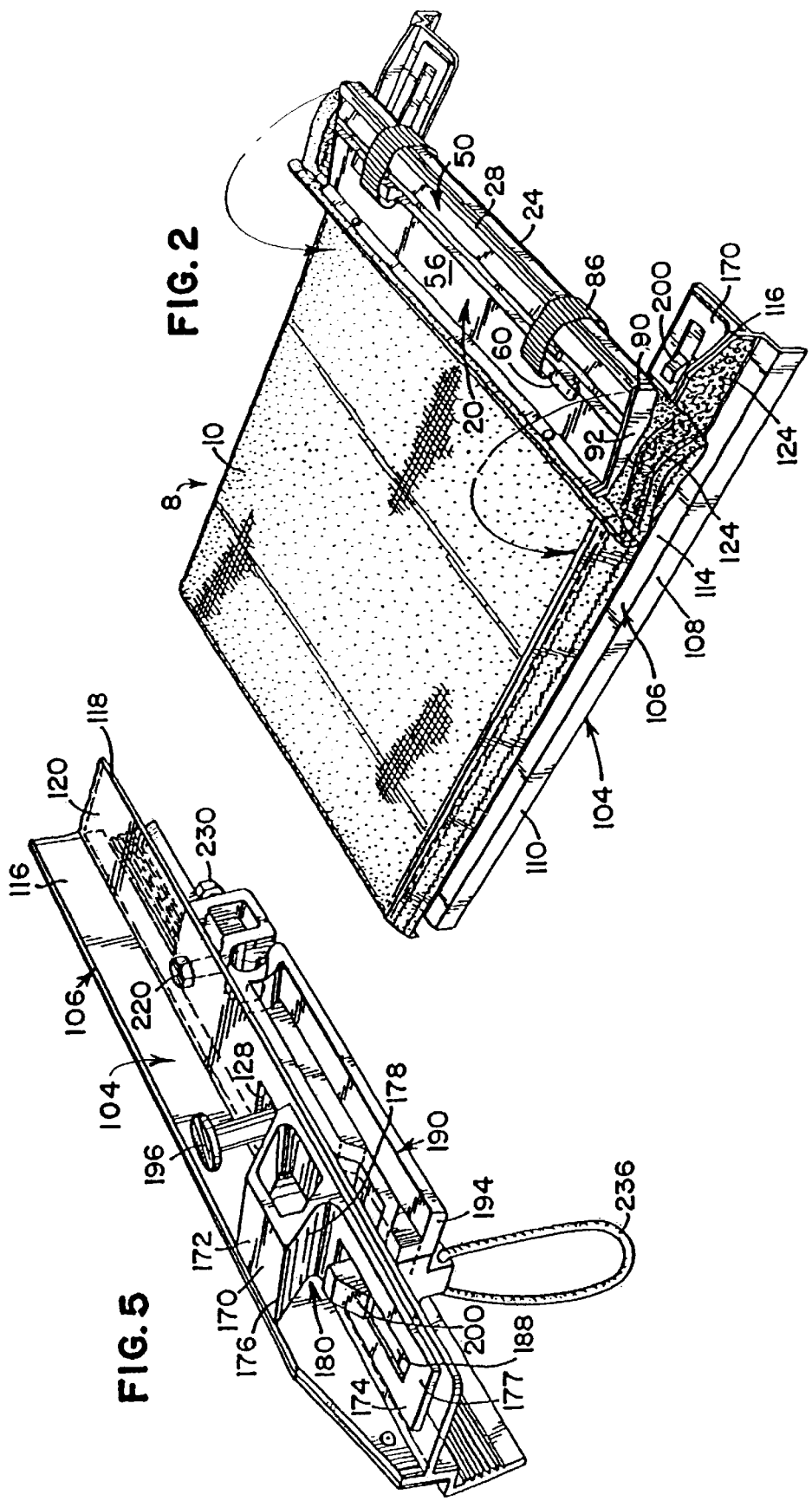
FIG. 2 is a fragmentary perspective view of the preferred tonneau cover apparatus 8 shown in FIG. 1 (but separated from the pickup truck), illustrating the end plate and flexible cover after they have been rotated out of the covered or fixed stretching position shown in FIG. 1.

FIG. 2 shows the preferred tonneau cover apparatus 8, including the flexible, stretchable fabric cover 10, separated from the pickup truck. The rearward end of the flexible cover is attached to an elongated end plate 20 having an end plate cap 90 with an exterior surface 92. The other end of the flexible cover 10 is preferably attached to the front plate 19 (shown in FIG. 1) in a manner similar to that disclosed in U.S. Pat. No. 5,906,407 to Schmeichel ('407 patent), the disclosure of which is hereby incorporated herein by reference. The front plate 19 is preferably secured to the respective side rails 106 in an equivalent or similar manner that is disclosed in U.S. Pat. No. 5,076,338, the disclosure of which is hereby incorporated by reference, or in other Schmeichel patents that are incorporated herein by reference. In preferred embodiments, the front plate 19 will be secured to the respective side rails 106 in the manner disclosed in the '407 patent. The flexible cover 10 is preferably made of a resilient fabric material, which is preferably laminated to a polyester sheet to give it strength, flexibility, additional resilience, and water resistance.

Figure 3:
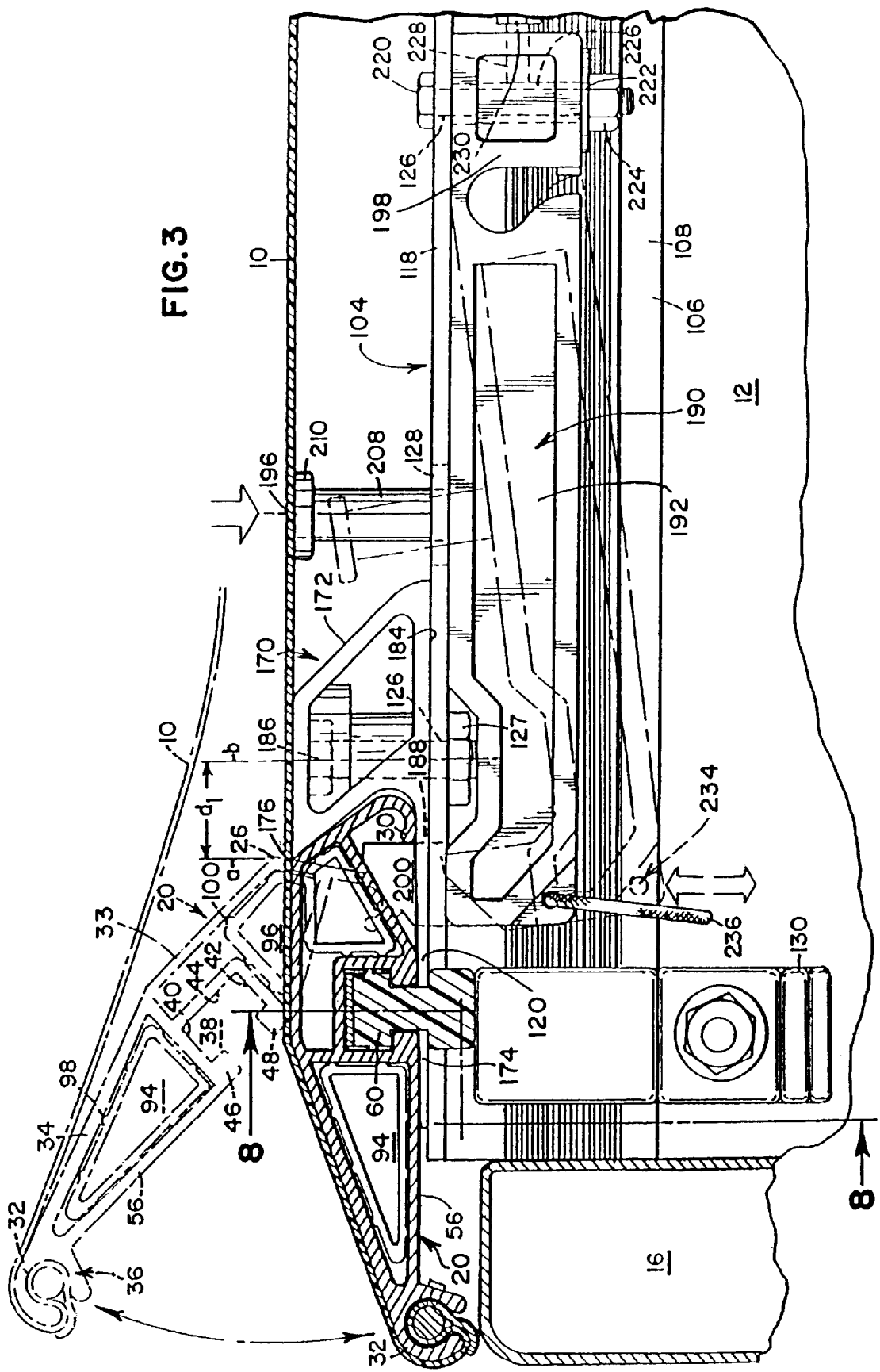
FIG. 3 is an enlarged fragmentary sectional view which illustrates (1) the preferred apparatus in the fixed stretching position, shown in FIG. 1, in which the end plate exerts a tensile force on the flexible cover, and (2) (in phantom lines) the preferred apparatus as it is unlatched and rotated out of the fixed stretching position in which the flexible cover is relatively loose or relaxed.

The preferred tonneau cover apparatus 8 is secured to the sidewalls 12 of the pickup truck 6 using clamps 130 (see FIGS. 3 and 8), which secure the respective side rails 106 to the inner wall 14, which is an extension of the sidewall 12. The front plate 19 is secured to the respective side rails 106 as described above and the end plate 20 is engaged to a pair of end plate engagement members 170 (see FIGS. 3 and 5). When the end plate 20 is engaged it will initially occupy a position with respect to the respective engagement members 170 similar to that shown in phantom in FIG. 3. The distal end 32 of the end plate 20 is then pushed downward and the peak or crest 26 of the end plate 20 will then pivot against the pivot point 176 of the respective engagement member 170 such that the foot 30 of the end plate 20 will push the pawl element 200 of the latch member 190 downward and out of its path, so that the end plate 20 can become fully engaged within the respective engagement members 170 and the foot 30 becomes fully engaged within the inclined portion 178 (see FIG. 5) of the engagement member 170, as shown in FIG. 3. In this position, the end plate 20 is in a closed or a fixed stretching position, where the end plate 20 preferably exerts a tensile force upon the flexible cover 10 so that the flexible cover 10 will stretch and remain taught over the cargo box 11.

When the end plate 20 is in the fixed stretching position, locking members 60 can be pushed into a closed or locking position to prevent the end plate 20 from being disengaged from the respective engagement members 170. The locking members 60 slide, when pushed, within a second channel 38 in the end plate 20. Because locking members 60 are designed to create friction when moved within the second channel 38, it takes some force to move the locking members 60 into a locking position like that shown in phantom in FIG. 8. This requirement for force to slide the locking members is designed to prevent the locking members from accidentally sliding into such a position when they are meant to be disengaged, and from sliding into an unlocked or disengaged position similar to that shown in FIG. 8 when they are meant to be in the fully engaged or locked position shown in phantom in FIG. 8.

When the end plate 20 is in the closed or fixed stretching position shown in FIG. 3, and it is desirable to open the tonneau cover apparatus 8 to gain access to the cargo box 11, the locking members 60 must be moved to a position where they are not engaged with the inwardly extending flange 118 of the support structure 104. The latch member 190 must then be depressed to a position consistent with that shown in phantom in FIG. 3 so that the pawl element 200 is disengaged from the foot 30 of the end plate 20 so that the foot can pivot out of the cavity proximate the inclined portion 178 of the engagement member 170 without being impeded by the pawl element 200. This can be accomplished either by pushing downward on the release member 196 or pulling downward on the grip element 236 with enough force to bend the latch member 190. In this way, the end plate 20 is freed to pivot out of the fully engaged relationship with the respective engagement members 170 and release the tension on the flexible cover and even roll the flexible cover up around the end plate in a manner similar to that described in the previously described and incorporated Schmeichel patents.

Figure 7:
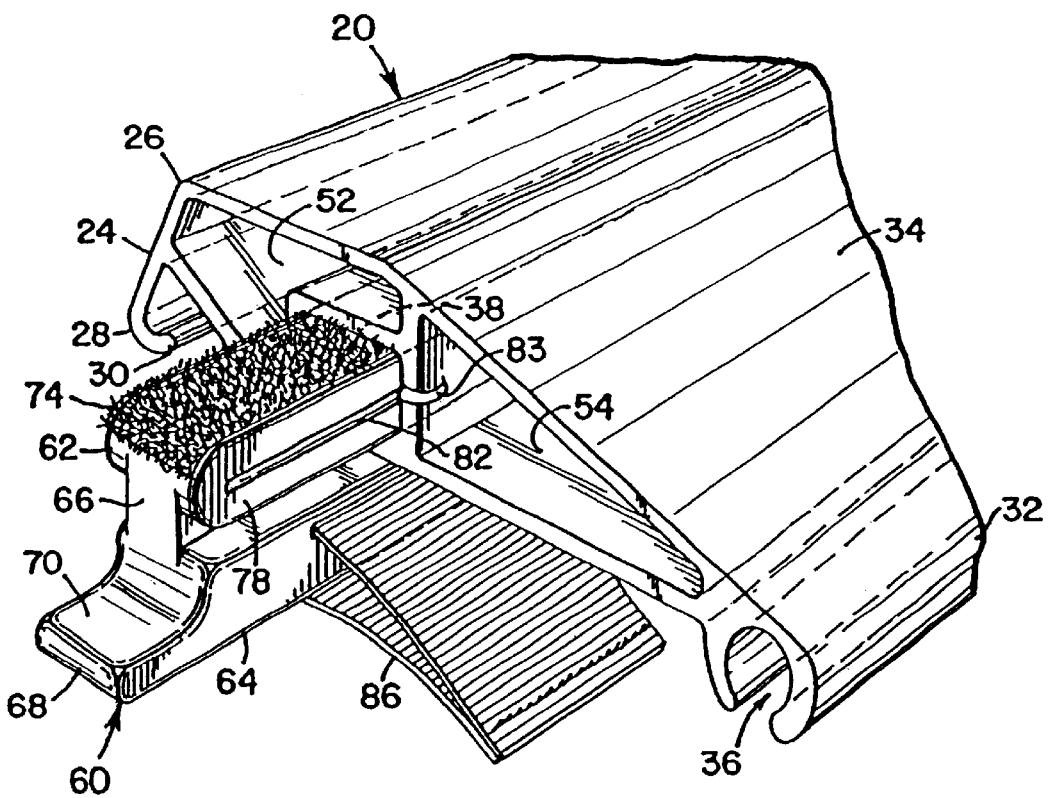
FIG. 7 is an enlarged fragmentary perspective view of the locking member 60 as it is being inserted into a channel 38 in the end plate 20 and illustrates the interaction between the end plate channel 38 and the frictional imparting element 74 and the guide strips 80 (not shown) and 82.

As depicted in FIG. 2, the end plate 20 is disengaged from a pawl element 200 on a latching member 190 and a locking member 60 is disengaged from an inward extending flange 118 of a side rail 106 (shown in FIG. 8) prior to pivoting or rotating the end plate 20 about an end plate engagement member 170 and out of a fixed stretching position shown in FIG. 1. Although a generally rectangularly shaped end plate 20 is depicted in the drawings, it is understood that the end plate 20 may have other configurations without departing from the spirit and scope of the invention. Moreover, it is understood that only selected portions of the end plate 20 are necessary to normal operation and that unnecessary portions may be omitted, if desired. In preferred embodiments the end plate is made of an aluminum alloy material. Referring now also to FIG. 7, the end plate 20 has an underside 56, a base portion 24, an upper surface 33 and a trailing surface 34.

Figure 12:
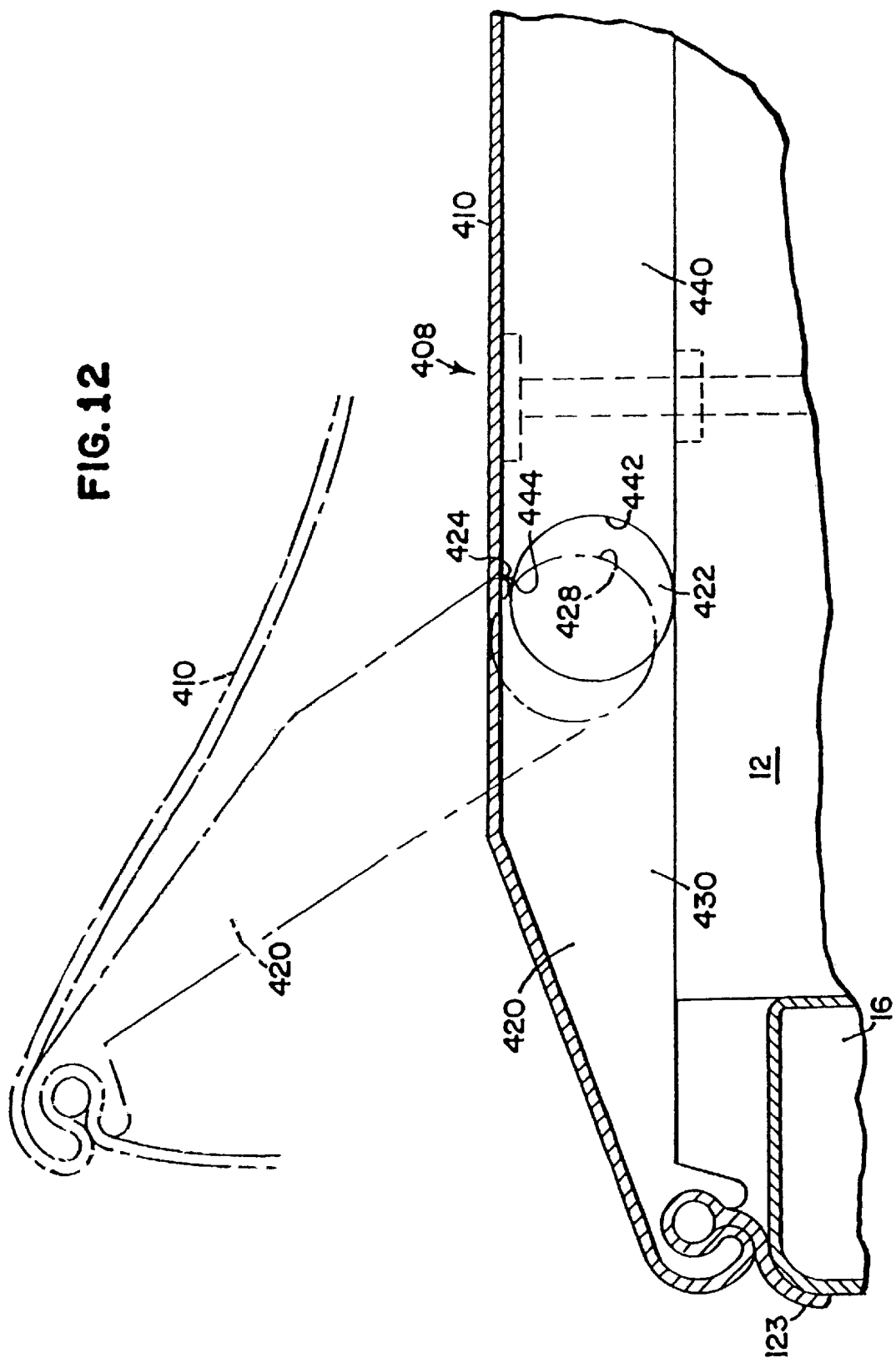
FIG. 12 is an enlarged fragmentary sectional view of the alternate embodiment of FIG. 11 which illustrates the alternate apparatus in a fixed stretching position in which the end plate 420 exerts a tensile force to a flexible cover 410, and which illustrates in phantom lines the apparatus as it is unlatched and rotated out of the fixed stretching position in which the flexible cover is relatively relaxed.

FIGS. 2, 3, 5 and 8–10 also illustrate attachment of the flexible cover 10 to the support frame 104. As depicted, the support frame 104 preferably includes side rails 106 having a vertical attachment portion 108 including a sidewall contacting surface 110, an inwardly extending portion 114, and an inclined portion 116 onto which one half of a two part, hook and loop type fastener 124 has been attached. The flexible cover 10 has been provided with the other half of the two-part, hook and loop type fastener 124 to enable the sides of the flexible cover 10 to be removably attached to the inclined portion 116 of the side rail 106. One method by which an end of the flexible cover 10 is attached to a portion of the end plate 20 shown in FIG. 2 is described in U.S. Pat. Nos. 5,076,338 and 5,174,353, the disclosures of which are incorporated by reference. Note that in the embodiment shown in FIG. 2 the strap 86 is attached to a locking member 60 rather than a portion of the end plate itself. It will be appreciated that this strap might be just as effective if it were attached directly to the end plate (not shown) in other embodiments and that it need not be attached to the locking members 60. As shown in FIG. 12, which discloses an alternate embodiment, the flexible cover material can be secured in such a way that additional material creates a flap 123 which covers the top of the tailgate 16 and provides a further seal or covering to limit the passage of dust and moisture into the cargo box 11.

FIGS. 3 and 10 illustrate the apparatus as it pivots or rotates position into and out of a fixed stretching position and when in the fixed stretching position. As best seen in phantom lines, end plate 20 includes a distal end 32, which terminates in a first channel 36, which receives an end of the flexible cover 10. The end plate 20 also includes a second channel 38, which is sized to slidingly receive a locking member 60. The second channel 38 is generally T-shaped and includes opposing sidewalls 40, 42 an upper wall 44 and opposing flanges 46, 48. The end plate or stretcher bar 20 also includes cavities 52, 54, which are sized to receive plugs 94, 96 that extend from an end plate cap 90. The plugs 94, 96 are provided with ribs 98, 100 which allow the end plate cap 90 to be frictionally attached to the end plate 20. When the end plate 20 is rotated or pivoted into a fixed stretching position, a peak or crest 26 of the end plate 20 contacts a pivot point 176 of an end plate engagement member, or strike 170. A ridge 28 on the base portion 24 of the end plate 20 then sweeps across an upper surface 177 of an extension portion 174 of the end plate engagement member 170. Referring now also to FIGS. 4–5 and 8–9, the ridge 28 then contacts and deflects the pawl element 200 of the engagement portion 194 of a latching member 190. That is to say, the latching member 190 is deflected from a first position where the end plate is prevented from being disengaged from the fixed stretching position to a second position, which permits the apparatus to be disengaged from the fixed stretching position. After the ridge 28 passes the pawl element 200, two things occur. First, the base portion 24 is moved into a base portion receiving area 180 in the end plate engagement member 170, and second, the latching member 190 moves from the second position to the first position wherein the pawl element 200 of the latching member 190 is biased into a pawl receiving area 50 of the end plate where it confronts the foot 30 on the end plate 20. The pawl element 200 may be disengaged from the foot 30 and withdrawn from the pawl receiving area 50 by placing downward pressure on the release member 196 or pulling downward on the grip element 236, which is engaged with the latching member 190 through an opening 234.

Figure 4:
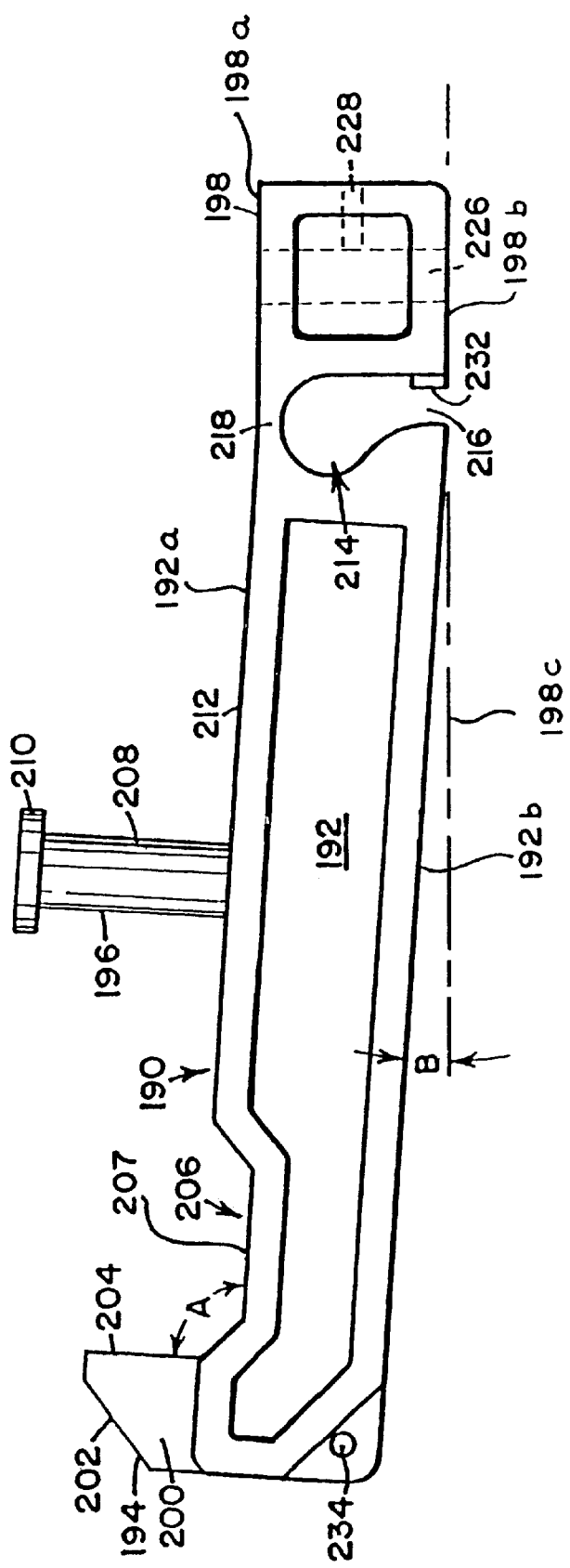
FIG. 4 is an enlarged simplified side view of a latch member 190 of the preferred apparatus, when disengaged from the apparatus partial or complete views of the latch member, or parts thereof, shown in situ in various.

Turning more specifically to FIG. 4, the latching member 190 has a body portion 192, an engagement portion 194, a release member 196 and an attachment portion 198. The engagement portion 194 includes a pawl element 200 having a ridge engagement surface 202 and a foot engagement surface 204. Adjacent the foot engagement surface 204 is a recess or relief 206 which accommodates a fastening element 186 used to attach the end plate engagement member or strike 170 to the support frame 104 (see FIG. 3). Note that the angle "A" between the foot engagement surface 204 and a top surface 207 of the recess 206 of the body portion 192 is less than or equal to 90 degrees, preferably about 88 degrees to prevent the end plate 20 from being forced out of the fixed stretching position when lifting force is applied upwardly upon the bottom of end plate 20 when it is in the fixed stretching position as shown in FIG. 3. The upper surface 212 of the latch member 190 is generally parallel with the top surface 207 of the recess 206, so the angle "A" will be the same as an angle (not shown) between the foot engagement surface 204 and the upper surface 212 of the latch member 190. The latching member 190 includes a release member 196, which is preferably an upright member 208 with an enlarged head 210. In operation, the release member 196 is manipulated by placing downward pressure on the enlarged head 210 of the release member 196 through the flexible cover 10 and is used to disengage the pawl element 200 from the foot 30 of the end plate 20. Referring now also to FIG. 9, an upwardly extending recess 214, having a throat portion 216, partially delineates or separates the attachment portion 198 from the body portion 192. The attachment portion 198 is connected to the body portion 192 by a thinned portion 218. The attachment portion 198 includes a slot 226, which receives a fastener 220 and a threaded aperture 228, which receives an adjustment member or element 230. The attachment portion 198 also includes a limiter or stop 232, which controls the range of motion of the latching member 190 as it moves from the first position to the second position. Note that the upper and lower surfaces 198a, 198b of the attachment portion 198, that are parallel to broken line 198c (shown schematically in FIG. 4), reside at an angle, B, with respect to upper and lower surfaces 192a, 192b of the body portion 192, respectively, when the latch member 190 is disengaged from the side rail 106. This angle "B" is about 1 to about 7, preferably about 4 degrees and ensures that the upper surface 212 of the latching member 190 biasingly contacts an inwardly extending flange 118 on a side rail 106 when the latching member 190 is attached thereto as shown in FIGS. 3 and 5. The latching member 190 is preferably manufactured from a glass filled nylon resin material.

FIG. 5 illustrates the juxtaposition between a side rail 106 an end plate engagement member or strike 170 and a latching member 190. As can be seen, the side rail 106 includes an inclined portion 116 and an inwardly extending flange 118 with an upper surface 120. The end plate engagement member 170 generally includes a body portion 172 and an extension portion 174. More specifically, the body portion 172 includes a pivot point 176, an inclined portion 178 and an end plate base portion receiving area 180. The extension portion 174 is somewhat tapered and includes an upper surface 177 and an aperture 188. Referring now also to FIG. 3, the end plate engagement member 170 has a lower surface 184 common to the body portion 172 and the extension portion 174. Also referring to FIG. 3, the body portion 172 of the end plate engagement member 170 includes an integrally attached fastening element 186, a portion of which extends beyond the body portion 172 and through an aperture 126 in the flange 118 and which is secured by an appropriately sized nut 127. Like the aforementioned latching element 190, the end plate engagement member 170 is formed so that the lower surface 184 is slightly concave. This allows the extension portion 174 to biasingly contact the upper surface 120 of the flange 118 when the end plate engagement member 170 is attached thereto. As with the aforementioned latching member, the end plate engagement member 170 is preferably manufactured from a glass filled nylon resin material.

The bolt or fastening element 186 preferably has an axis "b" which passes through the center of the bolt 186. This axis "b" is preferably located a distance from the pivot point 176 and denoted by line "a" in FIG. 3, by a distance "$d_1$", which is equal to or less than 4 inches, preferably 1.5 inches. In a more preferred embodiment, this distance will be about 13/16ths of an inch.

Figure 6:
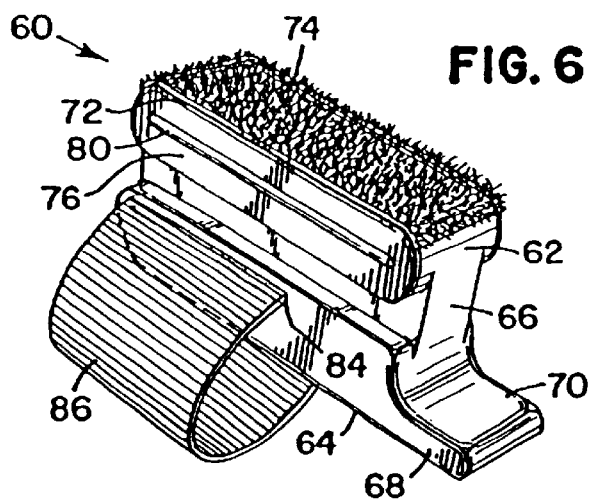
FIG. 6 is an enlarged perspective view of the locking member 60 of the preferred apparatus, which illustrates the position of the locking finger and the location of the frictional elements.

FIG. 6 illustrates a locking member 60 in isolation prior to use. The locking member 60 generally comprises an upper portion 62, a lower portion 64 and a web 66 therebetween. In particular, the upper portion 62 includes a top surface 72 onto which a friction-imparting element 74 has been affixed. The term friction-imparting element in the context of this invention is understood to mean a material, which is capable of causing friction between the locking member 60 and the end plate 20 when the locking member is moved within the end plate. The preferred friction imparting element 74 in this instance is a loop portion of a hook and loop type fastening element. The upper portion 62 also includes opposing side surfaces 76, 78 and corresponding opposite guide strips 80, 82. The term guide strip in the context of this invention is understood to mean a structure, which is preferably relatively rigid in comparison to the friction-imparting element, although it need not be so. The preferred guide strip in this instance is composed of the same material as the locking member. As illustrated, the upper portion 62 has the same general cross-sectional T-shape as the channel 38 into which it is inserted. While a T-shape is illustrated, it is understood that the channel 38 and upper portion 62 may be formed in other complimentary configurations without departing from the spirit and scope of the invention. When locking member 60 is first placed into the channel 38, the guide strips 80, 82 are generally shaved off a bit to fit the channel. Once the resulting shavings 83 fall away, the locking member 60 will be friction fit in the channel 38. This is important so that the locking member will not inadvertently slide closed when it is intended to be open or slide open when it is intended to be closed. Turning to the lower portion 64, one end of the lower portion includes a finger 68, which extends beyond the body of the lower portion 64. The finger portion 68 includes an engagement surface 70, which is configured to slidingly engage the flange 118 of a side rail 106 (see FIG. 8). The lower portion 64 is also provided with a slot 84 through which a strap 86 may be threaded, the strap 86 serving to position and align the base portion 24 of the end plate 20 adjacent the end plate engagement member or strike 170 prior to pivoting the end plate into the fixed stretching position shown in FIGS. 1 and 3.

FIG. 7 illustrates a locking member 60 as it is being installed into a channel 38 of an end plate 20. As the locking member 60 is inserted into the channel 38, the friction-imparting element 74 is compressed and comes into sliding contact with the upper surface 44 of the channel 38 (see FIG. 3). At the same time, the guide strips 80, 82 are engaged by sidewalls 40, 42 of channel 38 (see also FIG. 3). The sidewalls 40, 42, being constructed of relatively harder material, modify the opposite guide strips as the locking member is inserted into the channel 38. As depicted a portion 83 of the opposite guide strips are planed away or shaved during assembly. Thus, the width of the upper portion 62 and attendant guide strips 80, 82 is then sized to friction fit within the width of the channel 38. In especially cold weather, the resin material of the preferred locking member 60 and the aluminum alloy of the preferred end plate both contract, but the locking member 60 will contract somewhat more than the end plate 20. In especially hot weather, both the preferred locking member 60, made of resin material, and the preferred end plate 20, made of aluminum alloy, will expand, but it is believed that the expansion of the aluminum alloy will be greater. In each case, therefore, in both especially cold temperatures and in especially hot temperatures, the preferred locking member 60 and the preferred end plate 20 will contract or expand at different rates and this will cause some looseness of the sliding locking member 60 within the end plate 20. The use of the friction-imparting element 74 is intended to compensate for this variation and to prevent the locking member 60 from sliding into a locked position when it has been placed, and is intended to remain in, an open position.

In the preferred embodiment, the friction imparting element 74 and the guide strips 80, 82, are all in sliding contact with the walls 40, 42, 44, respectively, while the remaining surfaces of the upper portion 66 are in sliding contact with flanges 46, 48 of the second channel 38. These sliding contacts combine to provide a relatively constant resistive force over a wide range of temperatures as the locking element is manipulated along the channel. While the preferred embodiment features one friction imparting element and a plurality of guide strips elements, it is understood that other combinations may be used. As with the aforementioned latching member and end plate engagement member, the locking member 60 is preferably manufactured from a glass filled nylon resin material.

FIG. 8 illustrates a portion of the apparatus attached to an inner sidewall 14 of the pickup truck. More specifically, a side rail 106 of the support frame is attached to the inner sidewall 14 preferably by a plurality of clamps 130. The clamp 130 has a first arm 132 and a second arm 150. As illustrated, the first arm 132 and the second arm 150 engage each other at contact surfaces 139 and 157, respectively. The contact surfaces 139 and 157 serve several different functions. First, the contact surfaces 139 and 157 provide a point about which the arms 132 and 150 may pivot with respect to each other. And second, the contact surfaces 139 and 157 serve to align and guide the arms 132 and 150 so that they are brought into confronting relation with each other when the clamp 130 is tightened. The first arm 132 includes a proximal end 134, a transition portion 136 and a distal end 138. The proximal end 134 includes the contact surface 139 having a recess 140, which is configured to receive and rotatingly support a pivot or projection 158 on the second arm 150. The preferred configuration of the recess 140 is generally oriented orthogonally to the longitudinal axis of the arm 132. The proximal end 134 also includes a transversely aligned cavity 144, which is coaxially aligned with an aperture 166 in a nut 167. The cavity 144 is sized to securely retain the nut 167 of a fastening element 169, which includes nut 167 and bolt 164. The cavity 144 is sized to loosely receive the shaft of a bolt 164 of the fastening element 169. Although the aperture 166 is sized to fit the bolt 164, the cavity is much larger which allows the clamp to fall open easily at the end nearest the distal end 138 and distal non-parallel side joint between two surfaces similar to that shown in FIG. 8. The distal end 138 of the first arm 132 includes a sidewall-contacting portion 146, which is preferably provided with a grip element 148. The grip element 148 has an irregular shaped surface and may be suitably affixed to the sidewall-contacting portion 146. The preferred grip element 148 has an irregular surface similar to course sandpaper and the preferred method of affixing is by using an adhesive. The second arm 150 includes a proximal end 152, a transition portion 154 and a distal end 156. As mentioned above, the proximal end includes a contact surface 157 having a pivot or projection 158, which is configured to be rotatingly supported within a recess 140 in the proximal end 134 of the first arm 132. As with the recess 140, the preferred configuration of the projection is generally oriented orthogonally to the longitudinal axis of the arm 150. The proximal end 152 of the second arm also includes a transversely aligned cavity 145, which is sized to loosely receive the shaft of a bolt 164 of the fastening element 169. The distal end 156 includes a side rail-contacting portion 162. As depicted, the side rail-contacting portion 162 is configured to mesh with a similarly configured surface on a vertical attachment portion 108 of a side rail 106. Since the oversized cavities 144,145 of the respective first and second arms 132, 150 allow the respective arms to pivot within the joint created by the insertion of the pivot 158 into the pivot receiving recess 140, the respective side rail and sidewall contact portions 146, 162, respectively, can pass through a range of non-parallel orientations with respect to one another especially enabling the clamp 130 to forcibly hold together a pair of relatively flat objects hose opposite surfaces when joined together present non parallel surfaces.

In operation, to secure a side rail 106 to an inner wall 14 of a truck, a side rail 106 is brought into contact with an inner sidewall 14 of a truck 6. A clamp 130 is then positioned so that it straddles the inner sidewall 14 and the side rail 106. With the recess 140 and the projection 158 of the respective contact surfaces 139 and 157 in communication with each other, the fastening element is then snugged up so that the distal ends 138 and 156 contact the sidewall 14 and side rail 106, respectively. The fastening element is then manipulated to gradually increase the clamping force. As the force is increased several things occur. First, the arms 132 and 150 are aligned and guided by the cooperative interaction of the contact surfaces 139 and 157. Second, limiter surfaces 142 and 160 on the first and second arms 132, 150, respectively, converge towards each other, and third, the arms 132, 150 flex slightly, at the transition portions 136, 154, respectively, where they have some give due to the materials used to make them and the design of respective first and second arms 132, 150 which include the narrower transition portions 136, 154, respectively. When the limiter surfaces 142 and 160 contact each other, attachment of the side rail 106 to an inner sidewall 14 is essentially completed. This is because the clamp may not be easily over tightened. With this preferred embodiment, not only is possible overtightening substantially reduced, but the clamp 130 provides a relatively constant clamping force, which compensates for differences in thickness of the material to be clamped together and also difference in attachment points.

FIG. 8 also illustrates the operation of the locking member 60 as it may be manipulated between a first position (shown in phantom lines) where it operatively connects an end plate 20 to a side rail 106 of a support frame 104 and a second position where the locking member 60 is disengaged from the side rail 106 of the support frame 104. Note in the first position, that engagement surface 70 of the finger portion 68 engages the lower surface 122 of the side rail flange 118.

FIG. 9 illustrates in broken line a position of the latching member 190 at the point where either the release member 196 has been manipulated by placing a downward force upon it, or by pulling downward on the body portion 192 or the chord 236 secured to the far end of body portion 192 and the pawl element 200 (see FIG. 4) has been disengaged from the pawl element receiving area 50 of the end plate 20 (see FIG. 3). That is, the latching member 190 has been moved to the second position. Note that the throat portion 216 has been effectively closed and the body portion 192 is in contact with the limiter 232. As the release member 196 is manipulated, it is contained within or encircled by an appropriately over-sized opening 128 in the inwardly extending flange 118 of a side rail 106. The latching member 190 is attached to the flange 118 by a fastening element 219, such as a bolt 220 and attendant washer 222 and nut 224. The bolt 220 is inserted through an appropriately sized aperture 126 and through the latching member 190, after which it is secured with a washer 222 and nut 224. The latching member 190 may be adjusted relative to the flange 118 and bolt 220 by the provision of a somewhat oversized slot 226, which slidingly admits the shaft of a bolt 220 of the fastening element 219. Positioning of the shaft of the bolt 220 within the slot 226 may be achieved by manipulating an adjustment bolt 230, which is threadably received in a threaded aperture 228 within the attachment portion 198 of the latch member 190.

Referring now specifically to FIG. 10, an end plate 20 is shown in the fixed stretching position in which the pawl element 200 (see FIGS. 3 and 5) of the latching member 190 projects through the flange 118 of a side rail 106 and into the pawl receiving area 50 of the end plate 20. The locking member 60 has been manipulated or moved to the second position so that it lies inboard of the flange 118. In this position, the finger 68 does not operatively connect the end plate 20 to the support frame. Note that the strap 86 has one end, which is attached to the locking member 60, and another end which is attached to a mid bar or bow 250. Such an arrangement serves to guide the peak/crest 26 of the end plate 20 into operative contact with the pivot point 176 of the end plate engagement member 170 prior to rotating the end plate 20 into the fixed stretching position.

Figure 11:
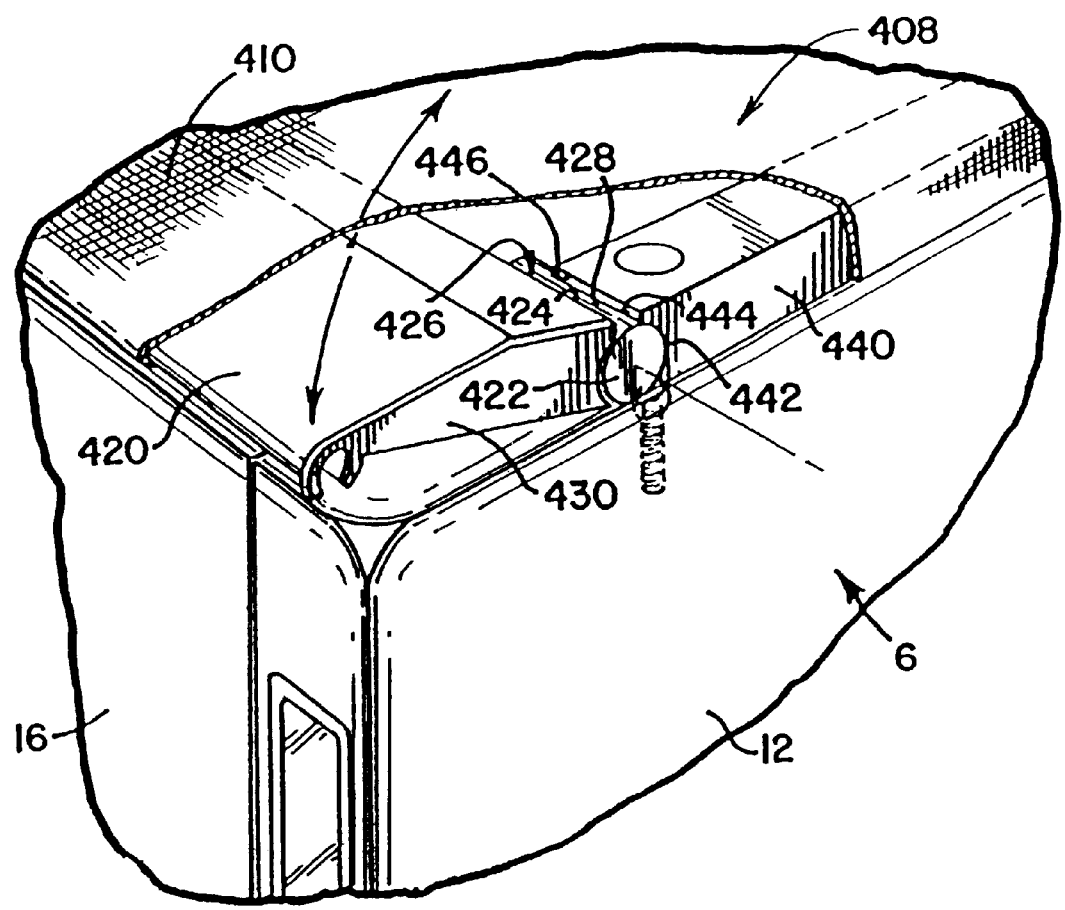
FIG. 11 is a fragmentary perspective view showing an alternate embodiment of the invention, which is similar to the preferred embodiment, but has different end plate 420 which engages in a somewhat different way with the end plate engagement member 440, wherein the end plate 420 is shown in an engaged position, but not in a fixed stretching position similar to that shown in FIG. 3.

Referring now also to FIGS. 11 and 12, a further embodiment of the tonneau cover apparatus 408 is depicted. A flexible cover 410 is shown attached to an end plate 420 having a side panel 430. This embodiment differs from the preferred embodiment in that the end plate 420 is provided with generally radially shaped base portion 422 and the end plate engagement member 440 is provided with a reciprocally shaped base portion receiving area 442 so that the base portion 422 can slidably pivot within the base portion receiving area 442 when fully engaged therewith as shown in FIG. 11, such that the end plate 420 can be been lifted away from the fixed stretching position, shown in FIG. 12, and the base portion 422 has pivoted within the receiving area 442, slightly away from the fixed stretching position. As shown in phantom in FIG. 12, when the base portion 422 is pivoted further, it will come away from the base portion receiving area 442, but not before it has slidingly pivoted somewhat within the receiving area 442.

In this embodiment, the reciprocating radial base portion 422 and base portion receiving area 442 of the end plate engagement member 440 compliment each other so that the base portion 422 can pivot smoothly within the engagement member 440 through a limited but significant radius. When the base portion 422 has pivoted far enough that the catch point 424 of the end plate 420 engagements the pivot point 444 of the engagement member 440, the notch or dip 426 between the catch point 424 and the arcuate surface 428 of the base portion 422 will rotate or slide over the rounded surface 446 of the pivot point 444, enabling the base portion 422 to disengage from the base portion receiving area 442 of the end plate engagement member 440.

Figure 13:
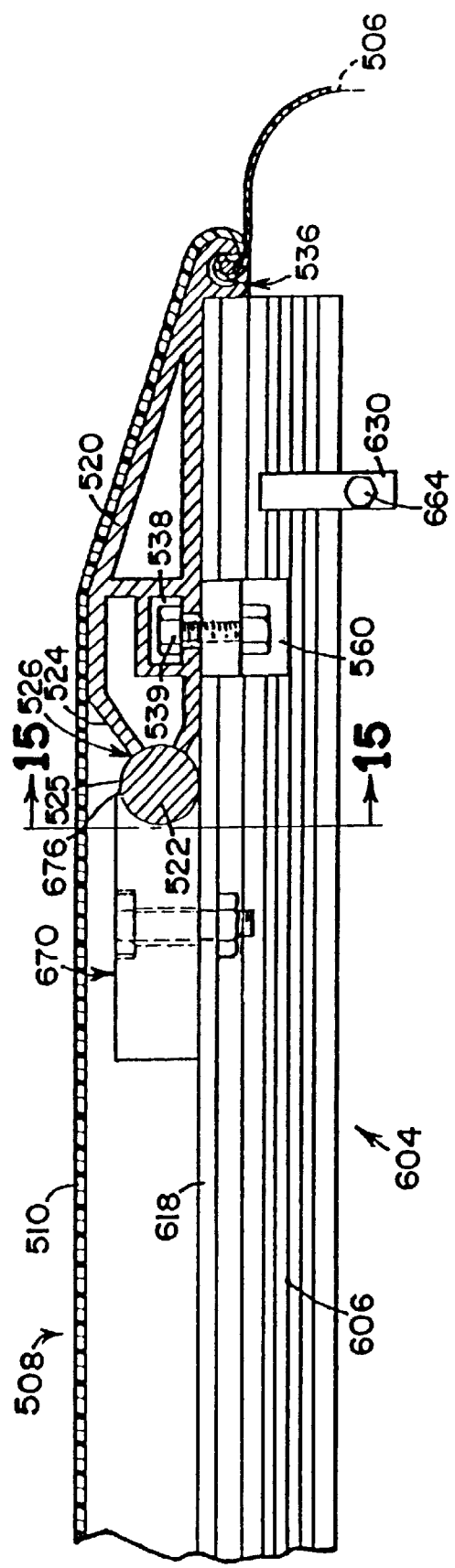
FIG. 13 is an enlarged fragmentary sectional view of a further alternate embodiment of the present tonneau cover apparatus, showing only a very small portion of an alternate pickup truck 506 in phantom, and showing the end plate 520 in a fixed stretching position.
Figure 14:
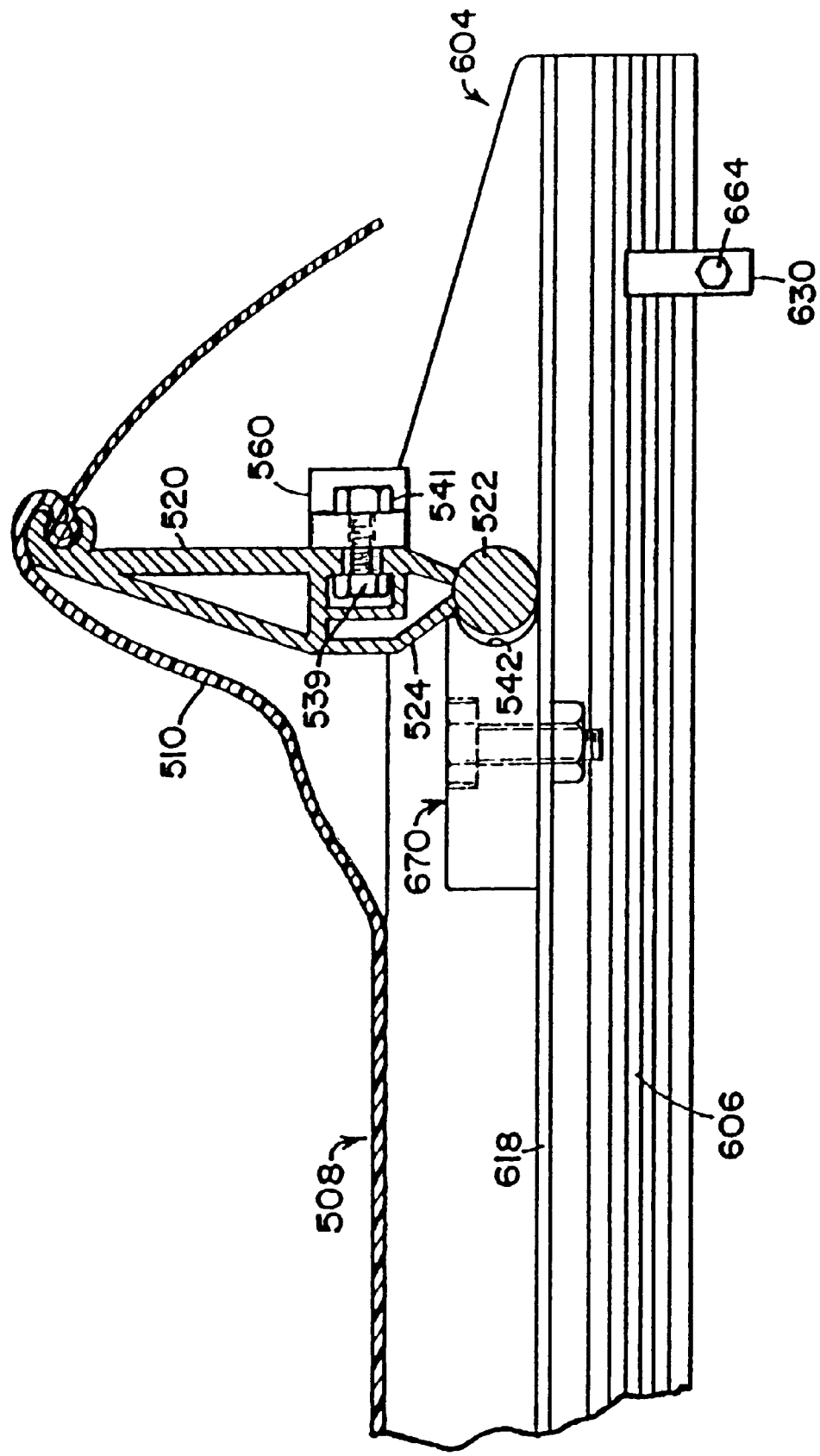
FIG. 14 is an enlarged fragmentary sectional view of the further alternate embodiment shown in FIG. 13, shown separate from the pickup truck, but showing the end plate 520 pivoted out of the fixed stretching position such that the flexible cover 510 is relatively loose or relaxed.
Figure 15:
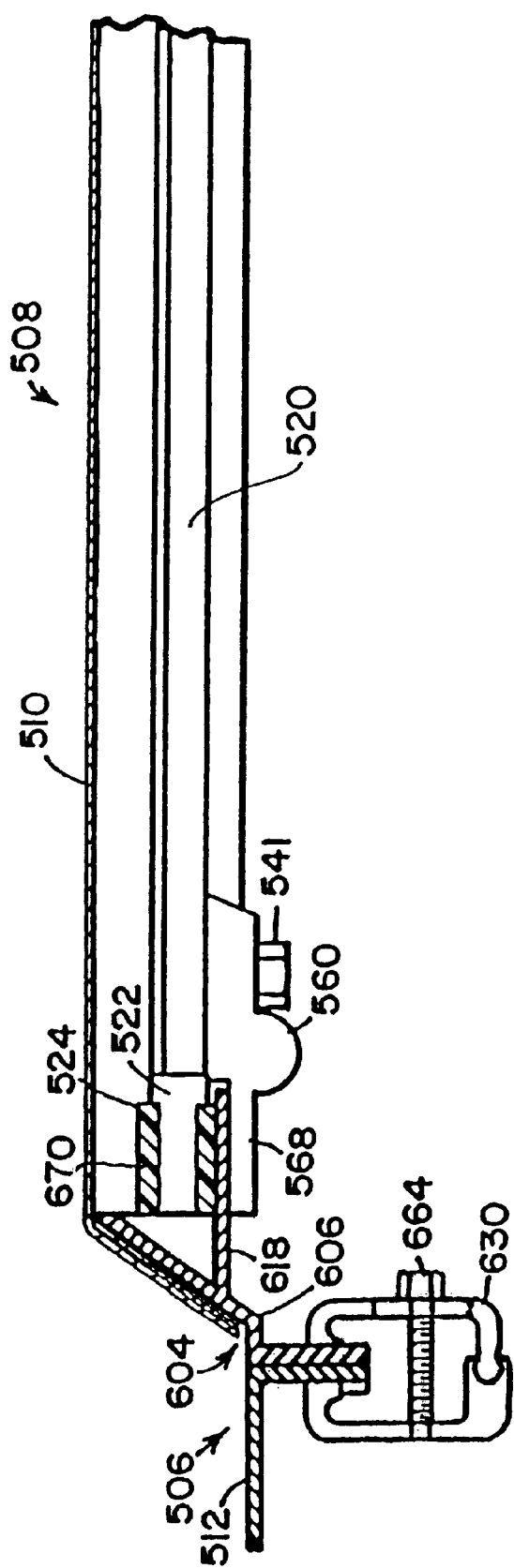
FIG. 15 is a fragmentary sectional view of the further embodiment shown in FIG. 13 as generally seen from line 15—15 of FIG. 13 showing the side rail 606 clamped to the sidewall 512 of the pickup truck 506 and showing the locking member 560 in a locking position where the finger portion 568 of the locking member 560 is engaged with an inwardly extending flange 618 of the side rail 606 to hold the end plate 520 in the fixed stretching position.

Referring now also to FIGS. 13, 14, and 15, a further alternate embodiment of the present invention is disclosed. In this embodiment, the end plate 520 again has a radial base portion 522 that engages a reciprocating radial base portion receiving area 542. The base portion 522 can slide smoothly within the base portion receiving area 542 in a manner similar to that disclosed with respect to the embodiment disclosed in FIGS. 11 and 12, but the arcuate catch point 424 and the arcuate surface 428, in the embodiment disclosed in FIGS. 11 and 12, are replaced with a flat catch surface 524. This surface joins to a portion of the radial surface 525 to form a notch or dip 526 at the junction thereof. In this case, however, when the notch or dip 526 becomes engaged with the preferably round surface of the pivot point 676 of the engagement member 670, the notch 526 will slide over or partially around the pivot point 676, as the end plate 520 pivots further and the base portion 522 disengages from the radial base portion receiving area 542.

The alternate embodiment shown in FIGS. 13, 14 and 15 also includes a locking member 560 that engages an inward extending flange 618 of a side rail 606 in a manner similar to that disclosed in the preferred embodiment, except that the locking member 560 is configured differently and the finger portion 568 is configured somewhat differently. In addition the locking member 560 is secured within a channel 538 by securing a bolt 539 to the locking member 560 with a nut 541. The bolt 539 slides easily within the channel 538 to engage the inwardly extending flange 618 of the side rail 606. In preferred embodiments, the end plate 520 will have a pair of radial base portions 522 proximate the respective ends of the end plate 520 which are configured to reciprocally engage a pair of engagement members 670 secured to each of a pair of side rails 606 attached to respective sidewalls (not shown) of the pickup truck 506. The other features of this alternate inventions are similar to or the equivalent to those features of the preferred embodiment disclosed in FIGS. 1–10. The further alternate embodiment of the invention includes a tonneau cover apparatus 508 having a support frame 604, which can be secured to a side wall (not shown) of a pick-up truck (not shown) using a clamp 630 secured at least in part with a bolt 664. A flexible cover 510 is shown, which is secured to the end plate 520 within a channel 536, shown in FIG. 13.

Figure 16:
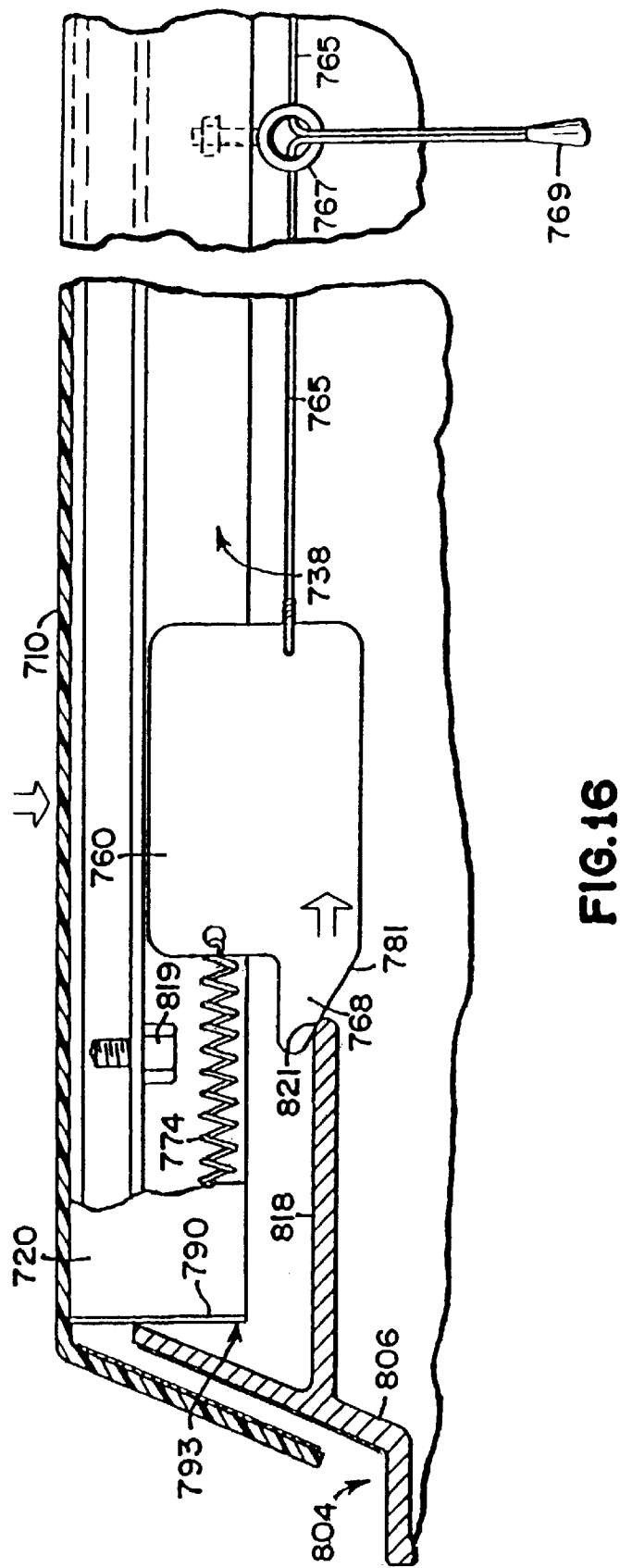
FIG. 16 is a fragmentary section view similar to that shown in FIG. 8, but of a portion of yet another alternate embodiment which is the same as the preferred embodiment shown in FIG. 8 except that there is no latch member and the locking member 760, while it is similar to the locking member 60 shown in FIG. 8, is shown in a disengaged position where the locking member 760 is in contact with the inwardly extending flange 818, furthermore, the locking member 760 does not have guide strips or a friction imparting element as disclosed in association with locking member 60 and locking member 760 slides easily within channel 738 which is the same as channel 38 in end plate 20 of the preferred embodiment shown in FIG. 8; the locking member 760 differing from locking member 60 also because it is secured within the end plate 720 with a tension spring 774 which biases the locking member 760 toward a position consistent with a latched or locked position shown in FIG. 17.

Referring now also to FIGS. 16 and 17, yet another alternate embodiment of the present invention is disclosed in which the alternate embodiment differs from the preferred embodiment disclosed in FIGS. 1–10, by providing an alternate locking member 760 which slides easily within a channel 738 similar to the second channel 38 of the preferred embodiment. The alternate embodiment includes a support frame 804 and a side rail 806 like those associated with the previously disclosed embodiment shown in FIGS. 1–10. In the alternate embodiment shown in FIGS. 16 and 17, the locking member 760 does not include the friction imparting elements or guide strips of the preferred embodiment. Instead, the alternate end plate 720 includes a tension spring 774 secured at each end of the elongated end plate 720 to bias each of two locking members toward a position consistent with a closed or locked position similar to that shown in FIG. 17. The tension springs 774 are secured to the respective interior surfaces (not shown) of respective end caps 790 at each of the ends 793 of the alternate end plate 720 and to the respective locking members 760, thereby biasing each of the locking members 760 toward a pair of stop bolts 819 secured to the end plate 720 proximate each of the respective ends 793 of the end plate 720. A draw cord or cable 765 is also attached to each of the respective locking members. Each of the respective draw cords are preferably passed through an eyebolt guide 767 and gathered together in a guide actuator 769.

During use, the alternate end plate 720 provides a locking or latch mechanism because the chamfered or beveled bottom surface 781 of each of the finger portions 768 of each locking member 760 will be displaced when the endplate 720 pivots with respect to the engagement members (not shown) into a closed or fixed stretching position from a position in which the end plate 720 is engaged with the respective engagement members (not shown), but has not pivoted into the position shown in FIG. 17. In FIG. 16, the locking members 760 are just beginning to be displaced as the end plate 720 pivots down to a closed position shown in FIG. 17. When the locking members 760 rest against the stop bolts 819, against which they are biased by the tension spring 774, they will engage the flange 818 if the end plate 720 is in the closed or fixed stretching position. As the end plate 720 is pivoted with respect to the engagement members (not shown), the beveled bottom surface 781 will first contact the upper side of the end 821 of the respective inwardly extending flange 818, will be forced away from the stop bolt 819 until the finger portion 768 passes below the flange 818 and end plate 720 is fully engaged as shown in FIG. 17. In FIG. 17, the beveled bottom surface 781 is no longer engaged with the upper side of the end 821 of the inwardly extending flange 818, and the spring biased locking member will engage the flange 818 as shown in FIG. 17. When the end plate 720 is not engaged as shown in FIG. 17 the spring biased locking member 720 will slide to the same position shown in FIG. 17, because it will spring biased against the stop bolt 819 which is positioned within the end plate 720 such that the locking member 760 will stop against the stop bolt 819 is the same position it will occupy within the end plate 720 when the locking member 760 is biased up against the end 821 of the flange 818.

In order to lift the end plate 720 and pivot it out of the fixed stretching position in which it resides in FIG. 17, a user can draw the draw cords or cables 765 by pulling on the pull actuator 769, thereby drawing the locking members 760 away from each of the respective flanges 818, thereby disengaging the respective finger portions 768 from the respective flanges 818 as shown in phantom in FIG. 17 when the locking members 760 are in this position, the end plate 720 can be pivoted out of the respective engagement members, and the cover 710 can be rolled up in order to gain better access to the cargo box.

Yet another alternate embodiment is shown in FIG. 18 where an embodiment like that shown in FIGS. 16 and 17 is shown, but which differs primarily only because the tension springs 774 of the embodiment shown in FIGS. 16 and 17 are replaced by compression springs 974 which push, rather than pull the locking member 960 or members, if there are more than one, which there preferably are, against the flange 1018 and/or the stop bolt 1019. In this case, the compression spring 974 slides over and is engaged by a first spring guide protrusion 977 extending away from the locking member 960 and a second spring guide protrusion 979 extending away from a spring stop 983. All the other features of this embodiment are preferably the same as the features of the alternate embodiment shown in FIGS. 16 and 17 and this embodiment operates generally in the same way with the exception of the operation of the compression spring 974 as compared to the tension spring 774. The embodiment shown in FIG. 18 includes a support frame 1004 having a side rail 1008. The end plate 920 is shown in an engaged position. The flexible cover 910 is engaged with the support frame 1004 and the finger 968 of the locking member 960, configured to slidingly engage an outwardly extending flange 1018 of the support frame 1004, is shown in an engage position, similar to that shown in FIG. 17 with respect to the prior embodiment, wherein the finger 968 can be slidingly positioned under an end 1021 of the outwardly extending flange 1018, as shown.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A tonneau cover apparatus for removable attachment about a top of a perimeter of a cargo box of a pickup truck, the perimeter of the cargo box including a forward end, two opposing sidewalls and a tailgate, the tailgate being positioned rearward of the forward end and having an open position and a closed position, the tonneau cover apparatus comprising:

a flexible cover, the flexible cover having first and second ends;

a support frame for attachment to the cargo box; the support frame having two opposing side rails and a pair of end plate engagement members, each of which is secured to one of the respective opposing side rails in a position rearward of the forward end when the tonneau cover apparatus is attached to the cargo box;

an end plate attached to the second end of the flexible cover, the end plate configured to cooperatively engage and pivot with respect to each of the respective end plate engagement members at first and second engagement positions; wherein the end plate engagement members cooperate to engage the end plate when the first end of the flexible cover is operatively connected to the support frame forward of the respective end plate engagement members, such that the end plate can pivot into and out of a fixed stretching position, at the respective first and second engagement positions, wherein the flexible cover is stretched so as to place a tension on the flexible cover; and a locking member, the locking member being secured to the end plate and movable between a first position and a second position when the end plate is in the fixed stretching position; wherein the locking member prevents the end plate from being disengaged from the fixed stretching position when the locking member is in the first position in which an extension of the locking member engages the side rail adjacent to the end plate to prevent such movement, and wherein the end plate can be disengaged from the fixed stretching position when the locking member is in the second position.

2. The tonneau cover apparatus according to claim 1, wherein the end plate has an underside and the locking member is operatively connected to the underside of the end plate.

3. The tonneau cover apparatus according to claim 1, wherein the locking member is spring biased toward the first position.

4. The tonneau cover apparatus according to claim 1, wherein the locking member is spring biased toward the first position and the locking member is operatively connected to an underside of the end plate and positioned in such a manner that the support frame displaces the locking member from the first position to the second position for a brief period of time when the end plate pivots with respect to the support frame into the fixed stretching position.

5. The tonneau cover apparatus according to claim 1, the locking member being a first locking member and the tonneau cover apparatus further including a second locking member, each of the respective first and second locking members being secured to the end plate proximate respective opposite ends of the end plate; wherein each of the opposing side rails include an inwardly extending flange portion and each locking member includes a finger portion, the finger portion of each locking member being engaged with the inwardly extending flange portion of the respective opposing side rail when the respective locking member is in a first position, the finger portion of each of the respective locking members disengaging from the inwardly extending flange portion of the respective side rail when the respective locking member is moved from the first position to a second position.

6. The tonneau cover apparatus according to claim 5, wherein each of the respective first and second locking members is biased toward the first position and force is required to displace the respective first and second locking members from the first position.

7. The tonneau cover apparatus according to claim 6, wherein the end plate includes a pair of springs, each spring interconnected between the end plate and one of the locking members so as to provide a biasing force between the end plate and the respective spring such that each of the respective locking members are biased toward the first position.

8. The tonneau cover apparatus according to claim 7, wherein the respective springs are selected from the group consisting of compression springs and tension springs.

9. The tonneau cover apparatus according to claim 8, wherein the spring tension spring.

10. The tonneau cover apparatus according to claim 1, wherein the side rail includes an inwardly extending flange portion and the locking member includes an outwardly extended finger portion, the finger portion of the locking member being engaged with the inwardly extending flange portion adjacent to the end plate and rearward of the respective first and second engagement positions with respect to the forward end when the tonneau cover apparatus is attached to the cargo box and the locking member is in the first position, the finger portion of the locking member disengaging from the inwardly extending flange portion when the locking member is moved from the first position to the second position.

11. The tonneau cover apparatus according to claim 10, the locking member being a first locking member and the tonneau cover apparatus further including a second locking member that is a functional and structural mirror image of the first locking member, the second locking member being secured to one end of the end plate and the first locking member being secured to the opposite end of the end plate.

12. The tonneau cover apparatus according to claim 10, wherein the end plate includes a spring, the spring being interconnected between the end plate and the locking member so as to provide a biasing tension between the end plate and the spring such that the locking member is biased toward the first position.

13. The tonneau cover apparatus according to claim 10, wherein the locking member has an upper portion having a main body which is slidably retained by the end plate, the finger portion is spaced apart from the upper portion and extends outwardly beyond the main body of the upper portion, and the locking member is biased toward the first position and force is required to displace the locking members from the first position.

14. The tonneau cover apparatus according to claim 13, wherein the end plate includes a spring, the spring being interconnected between the end plate and the locking member so as to provide a biasing tension between the end plate and the spring such that the locking member is biased toward the first position.

15. The tonneau cover apparatus according to claim 14, wherein the spring is selected from the group consisting of compression springs and tension springs.

16. The tonneau cover apparatus according to claim 10, wherein the locking member includes an upper portion having a main body which is slidably retained by the end plate, and the finger portion is spaced apart from the upper portion and extends outwardly beyond the main body of the upper portion.

17. The tonneau cover apparatus according to claim 16, wherein the end plate includes a generally "T" shaped channels and a cross-section of the upper portion of the locking member is generally "T" shaped; the generally "T" shaped channel of the end plate configured to slidingly receive and retain the generally "T" shaped cross-section of the upper portion.

18. The tonneau cover apparatus according to claim 17, further including oppositely disposed guide strips positioned between interior surfaces of the generally "T" shaped channel and an exterior surface of the generally "T" shaped upper portion of the locking member, the respective guide strips each imparting a frictional force which resists motion between the generally "T" shaped upper position of the locking member as it moves within the generally "T" shaped channel of the end plate.

19. The tonneau cover apparatus according to claim 17, wherein the generally "T" shaped upper portion of the locking member includes a friction imparting element and two oppositely opposed guide strips, the friction imparting element extending beyond the main body of the generally "T" shaped upper portion of the locking member to slidingly engage an interior surface of the generally "T" shaped channel, the friction imparting element and the respective guide strips creating frictional forces which resist motion by the locking member as the locking member moves relative to the end plate.

20. The tonneau cover apparatus according to claim 17, further including a friction imparting element positioned between an interior surface of the generally "T" shaped channel and an exterior surface of the generally "T" shaped upper portion of the locking member to which the friction imparting element is attached, the friction imparting element imparting a frictional force which resists motion by the generally "T" shaped upper portion of the locking member as it moves within the generally "T" shaped channel of the end plate.

21. The tonneau cover apparatus according to claim 20, wherein the friction imparting element is attached to an exterior surface of the generally "T" shaped upper portion of the locking member and the exterior surface of the upper element onto which the friction imparting element is attached is a top surface.

22. The tonneau cover apparatus according to claim 21, wherein the friction imparting element comprises a strip of a loop portion of a hook and loop type strip fastener, the strip extending along the longitudinal extent of the upper member.

23. A tonneau cover apparatus for removable attachment about a top of a perimeter of a cargo box of a pickup truck, the perimeter of the cargo box including a forward end, two opposing sidewalls and a tailgate, the tailgate being positioned rearward of the forward end and having an open position and a closed position, the tonneau cover apparatus comprising:
a flexible cover having first and second ends;
a support frame, the support frame capable of being removably attachable to the cargo box of the pickup truck and the first end of the flexible cover being attached to the support frame;
an end plate attached to the second end of the flexible cover, the end plate configured to cooperatively engage and pivot with respect to the support frame into and out of a fixed stretching position, wherein the flexible cover may be correspondingly tensed and relaxed; and
a locking member, the locking member being secured to the end plate and slidably movable along a length of the end plate between a first position and a second position; wherein the locking member prevents the end plate from being disengaged from the fixed stretching position when the locking member is in the first position, and wherein the end plate can be disengaged from the fixed stretching position when the locking member is in the second position.

24. The tonneau cover apparatus according to claim 23, wherein the end plate has an underside and the locking member is operatively connected to the underside of the end plate.

25. The tonneau cover apparatus according to claim 23, herein the locking member is spring biased toward the first position.

26. The tonneau cover apparatus according to claim 23, herein the locking member is spring biased toward the first position and the locking member is operatively connected to an underside of the end plate and positioned in such a manner that the support frame displaces the locking member from the first position to the second position for a brief period of time when the end plate pivots with respect to the support frame into the fixed stretching position.

27. The tonneau cover apparatus according to claim 23, wherein the end plate includes a spring, the spring being interconnected between the end plate and the locking member so as to provide a biasing tension between the end plate and the spring such that the locking member is biased toward the first position.

28. The tonneau cover apparatus according to claim 23, further including an additional locking member, each of the respective locking members being operatively connected to the end plate proximate respective opposite ends of the end plate; wherein the support frame includes two opposing side rails and a pair of end plate engagement members, one of which is secured to each of the respective side rails rearward of the forward end when the tonneau cover apparatus is attached to the cargo box, the end plate configured to cooperatively engage and pivot with respect to each of the respective end plate engagement members; wherein the end plate engagement members cooperate to engage the end plate such that the end plate can pivot into and out of a fixed stretching position wherein the flexible cover may be correspondingly tensed and relaxed; wherein the locking members are each movable between a first position and a second position; wherein the locking members resist movement of the end plate from the fixed stretching position when the locking members are in the first position, and wherein the end plate can be disengaged from the fixed stretching position when the locking members are in the second position.

29. The tonneau cover apparatus according to claim 28, wherein the end plate includes a generally "T" shaped channel, and a cross-section of the upper portion of each locking member is generally "T" shaped, the generally "T" shaped channel of the end plate configured to slidingly receive and retain the generally "T" shaped cross-section of the upper portion.

30. The tonneau cover apparatus according to claim 28, wherein each of the respective locking members is biased toward the first position and force is required to displace the respective locking members from the first position.

31. The tonneau cover apparatus according to claim 30, wherein the end plate includes a pair of springs, each spring interconnected between the end plate and one of the locking members so as to provide a biasing tension between the end plate and the respective spring such that each of the respective locking members is biased toward the first position.

32. The tonneau cover apparatus according to claim 31, wherein the respective springs are selected from the group consisting of compression springs and tension springs.

33. The tonneau cover apparatus according to claim 23, wherein the support frame includes an inwardly extending flange portion and the locking member includes a finger portion, the finger portion of the locking member extending below the inwardly extending flange portion of the support frame when the locking member is in the first position, the finger portion of the locking member being removed from the inwardly extending flange portion of the support frame when the locking member is moved from the first position to the second position such that the finger portion will not engage the inwardly extending flange portion of the support frame if the end plate is disengaged from the fixed stretching position.

34. The tonneau cover apparatus according to claim 33, wherein the locking member includes an upper portion having a main body which is slidably retained by the end plate, and the finger portion is spaced apart from the upper portion and extends outwardly beyond the main body of the upper portion.

35. The tonneau cover apparatus according to claim 33, wherein the end plate includes a spring, the spring being interconnected between the end plate and the locking member so as to provide a biasing tension between the end plate and the spring such that the locking member is biased toward the first position.

36. The tonneau cover apparatus according to claim 33, wherein the locking member has an upper portion having a main body which is slidably retained by the end plate, the finger portion is spaced apart from the upper portion and extends outwardly beyond the main body of the upper portion, and the locking member is biased toward the first position and force is required to displace the locking members from the first position.

37. The tonneau cover apparatus according to claim 36, wherein the end plate includes a spring, the spring being interconnected between the end plate and the locking member so as to provide a biasing tension between the end plate and the spring such that the locking member is biased toward the first position.

38. The tonneau cover apparatus according to claim 37, wherein the spring is selected from the group consisting of compression springs and tension springs.

39. A tonneau cover apparatus for removable attachment about a top of a perimeter of a cargo box of a pickup truck, the perimeter of the cargo box including a forward end, two opposing sidewalls and a tailgate, the tailgate being positioned rearward of the forward end and having an open position and a closed position, the tonneau cover apparatus comprising:

a flexible cover having first and second ends;

a support frame, the support frame capable of being removably attachable to the cargo box of the pickup truck and the first end of the flexible cover being attached to the support frame;

an end plate, the end plate being attached to the second end of the flexible cover, the end plate configured to cooperatively engage and pivot with respect to the support frame into and out of a fixed stretching position wherein the flexible cover may be correspondingly tensed and relaxed;

a locking member, the locking member being secured to the end plate and movable between a first position and a second position; wherein the locking member prevents the end plate from being disengaged from the fixed stretching position when the locking member is in the first position; and a latch member, the latch member operatively connected to the support frame and movable between a first position and a second position; wherein the latch member is biased toward the first position and prevents the end plate from being disengaged from the fixed stretching position when in first position, and wherein the end plate can be disengaged from the fixed stretching position when the latch member is in the second position and when the locking member is in the second position.

40. The tonneau cover apparatus according to claim 39, wherein the end plate has an underside and the locking member is operatively connected to the underside of the end plate.

41. The tonneau cover apparatus according to claim 39, wherein the locking member is spring biased toward the first position.

42. The tonneau cover apparatus according to claim 39, wherein the locking member is spring biased toward the first position and the locking member is operatively connected to an underside of the end plate and positioned in such a manner that the support frame displaces the locking member from the first position to the second position for a brief period of time when the end plate pivots with respect to the support frame into the fixed stretching position.

43. The tonneau cover apparatus according to claim 39, wherein the locking member is slidably retained by the end plate and configured to engage a portion of the support frame, and wherein the latching member is attached to the support frame and configured to engage a portion of the end plate when the latch is in the first position.

44. The tonneau cover apparatus according to claim 43, wherein the support frame includes an inwardly extending flange portion and the locking member includes a finger portion, the finger portion of the locking member being engaged with the inwardly extending flange portion of the support frame when the locking member is in the first position, the finger portion of the locking member disengaging with the inwardly extending flange portion of the support frame when the locking member is moved from the first position to the second position.

45. The tonneau cover apparatus according to claim 44, wherein the locking member has an upper portion having a main body which is slidably retained by the end plate, the finger portion is spaced apart from the upper portion and extends outwardly beyond the main body of the upper portion, and the locking member is biased toward the first position and force is required to displace the locking members from the first position.

46. The tonneau cover apparatus according to claim 45, wherein the end plate includes a spring, the spring being interconnected between the end plate and the locking member so as to provide a biasing tension between the end plate and the spring such that the locking member is biased toward the first position.

47. The tonneau cover apparatus according to claim 46, wherein the spring is selected from the group consisting of compression springs and tension springs.

48. The tonneau cover apparatus according to claim 43, further including an additional locking member, each of the respective locking members being operatively connected to the end plate proximate respective opposite ends of the end plate and slidable within the end plate; wherein the support frame includes two opposing side rails and a pair of end plate engagement members, one of which is secured to each of the respective side rails rearward of the forward end, the end plate configured to cooperatively engage and pivot with respect to each of the respective end plate engagement members; wherein the end plate engagement members cooperate to engage the end plate such that the end plate can pivot into and out of a fixed stretching position wherein the flexible cover may be correspondingly tensed and relaxed; wherein the locking members are operatively connected to the end plate rearward of the each of the end plate engagement members and movable between a first position and a second position; wherein the locking members prevent the end plate from being disengaged from the fixed stretching position when the locking members are in the first position, and wherein the end plate can be disengaged from the fixed stretching position when the locking members are in the second position.

49. The tonneau cover apparatus according to claim 48, wherein each of the respective locking members is biased toward the first position and force is required to displace the respective locking members from the first position.

50. The tonneau cover apparatus according to claim 49, wherein the end plate includes a pair of springs, each spring interconnected between the end plate and one of the locking members so as to provide a biasing tension between the end plate and the respective spring such that each of the respective locking members are biased toward the first position.

51. The tonneau cover apparatus according to claim 50, wherein the spring is selected from the group consisting of compression springs and tension springs.

* * * * *

UNITED STATES PATENT AND TRADEMARK OFFICE
CERTIFICATE OF CORRECTION

PATENT NO. : 6,543,835 B2
DATED : April 8, 2003
INVENTOR(S) : Charles M. Schmeichel and Steven C. Schmeichel It is certified that error appears in the above-identified patent and that said Letters Patent is hereby corrected as shown below:

Column 2,
Line 39, delete "gh" and insert therefor -- high --

Column 11,
Line 44, delete "hose" and insert therefor -- whose --;

Column 16,
Line 56, after the first occurrence of the word "spring" please insert -- is a --;

Column 17,
Line 41, delete "channels" and insert therefor -- channel --;
Line 42, delete "shaped;" and insert therefor -- shaped, --;

Signed and Sealed this

Twenty-sixth Day of August, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,543,835 B2  
DATED        : April 8, 2003  
INVENTOR(S)  : Charles M. Schmeichel and Steven C. Schmeichel It is certified that error appears in the above-identified patent and that said Letters Patent is hereby corrected as shown below:

<u>Column 18,</u>
Line 50, delete "herein" and insert therefor -- wherein --;
Line 53, delete "herein" and insert therefor -- wherein --.

Signed and Sealed this

Fourteenth Day of October, 2003

JAMES E. ROGAN
*Director of the United States Patent and Trademark Office*